(12) United States Patent (10) Patent No.: US 12,603,925 B2

Li (45) Date of Patent: Apr. 14, 2026

(54) REGISTRATION METHOD AND APPARATUS FOR INTERNET OF THINGS DEVICE, COMMUNICATION DEVICE, CORE NETWORK DEVICE, STORAGE MEDIUM AND SYSTEM

(71) Applicant: VIVO MOBILE COMMUNICATION CO., LTD., Dongguan (CN)

(72) Inventor: Huan Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 27 days.

(21) Appl. No.: 18/749,987

(22) Filed: Jun. 21, 2024

(65) Prior Publication Data

US 2024/0348668 A1 Oct. 17, 2024

Related U.S. Application Data

(63) Continuation of application No. PCT/CN2022/140795, filed on Dec. 21, 2022.

(30) Foreign Application Priority Data

Dec. 22, 2021 (CN) .......................... 202111583573.8

(51) Int. Cl.
*G06F 13/00* (2006.01)
*H04L 65/1073* (2022.01)

(52) U.S. Cl.
CPC ................................ *H04L 65/1073* (2013.01)

(58) Field of Classification Search
CPC ... H04L 65/1073; H04L 63/205; H04L 69/24; H04W 4/70; H04W 12/009; H04W 12/06;
(Continued)

(56) References Cited

U.S. PATENT DOCUMENTS 10,104,492 B2 * 10/2018 DiGirolamo ............ H04W 4/70
10,404,542 B2 * 9/2019 Pinheiro ................. H04W 4/70
(Continued)

FOREIGN PATENT DOCUMENTS

CN 102804738 A 11/2012
CN 102907068 A 1/2013
(Continued)

OTHER PUBLICATIONS

3rd Generation Partnership Project, "Technical Specification Group Services and System Aspects; Wireless and wireline convergence access support for the 5G System (5GS)", 3GPP TS 23.316, Sep. 2021, V17.1.0.
(Continued)

*Primary Examiner* — Kenneth R Coulter
(74) *Attorney, Agent, or Firm* — The Webb Law Firm

(57) ABSTRACT

A registration method for an Internet of Things device includes obtaining, by a target device, first policy information, where the first policy information is used for describing that an Internet of Things device is allowed to access the target device; obtaining, by the target device, an identifier of the Internet of Things device according to the first policy information; and sending, by the target device, a registration request message to a core network device, where the registration request message is used for requesting to register the Internet of Things device into the core network device, and the registration request message includes the identifier of the Internet of Things device.

20 Claims, 7 Drawing Sheets

A target device obtains first policy information — 201

The target device obtains an identifier of an Internet of Things device according to the first policy information — 202

The target device sends a registration request message to a core network device — 203

(58) Field of Classification Search
CPC ..... H04W 12/71; H04W 60/04; H04W 76/14; H04W 60/00
USPC .......................................... 709/227–229, 245
See application file for complete search history.

(56) References Cited

U.S. PATENT DOCUMENTS

| | | | | |
|---|---|---|---|---|
| 11,259,345 | B2 * | 2/2022 | Kawasaki | H04W 8/06 |
| 11,612,004 | B2 * | 3/2023 | Kawasaki | H04W 60/00 |
| 11,729,615 | B2 * | 8/2023 | Zhou | H04L 63/0884 726/7 |
| 11,991,544 | B2 * | 5/2024 | Puente Pestaña | H04W 8/186 |
| 2011/0213871 | A1 | 9/2011 | Digirolamo et al. | |
| 2012/0047551 | A1 | 2/2012 | Pattar et al. | |
| 2013/0188515 | A1 | 7/2013 | Pinheiro et al. | |
| 2020/0045546 | A1 * | 2/2020 | Zhou | H04L 61/2514 |
| 2020/0059976 | A1 | 2/2020 | Bhatia et al. | |
| 2021/0136840 | A1 * | 5/2021 | Kawasaki | H04W 84/12 |
| 2021/0136843 | A1 * | 5/2021 | Kawasaki | H04W 28/24 |
| 2022/0070702 | A1 * | 3/2022 | Puente Pestaña | H04L 43/065 |

FOREIGN PATENT DOCUMENTS

| | | |
|---|---|---|
| CN | 108834141 A | 11/2018 |
| CN | 109478179 A | 3/2019 |
| CN | 112966536 A | 6/2021 |
| WO | 2021057473 A1 | 4/2021 |

OTHER PUBLICATIONS

Munilla, Jorge et al., "5G-Compliant Authentication Protocol for RFID", Electronics, 2020, vol. 9.

* cited by examiner

---

| | |
|---|---|
| A core network device sends first policy information to a target device | 401 |
| The core network device receives a registration request message from the target device | 402 |

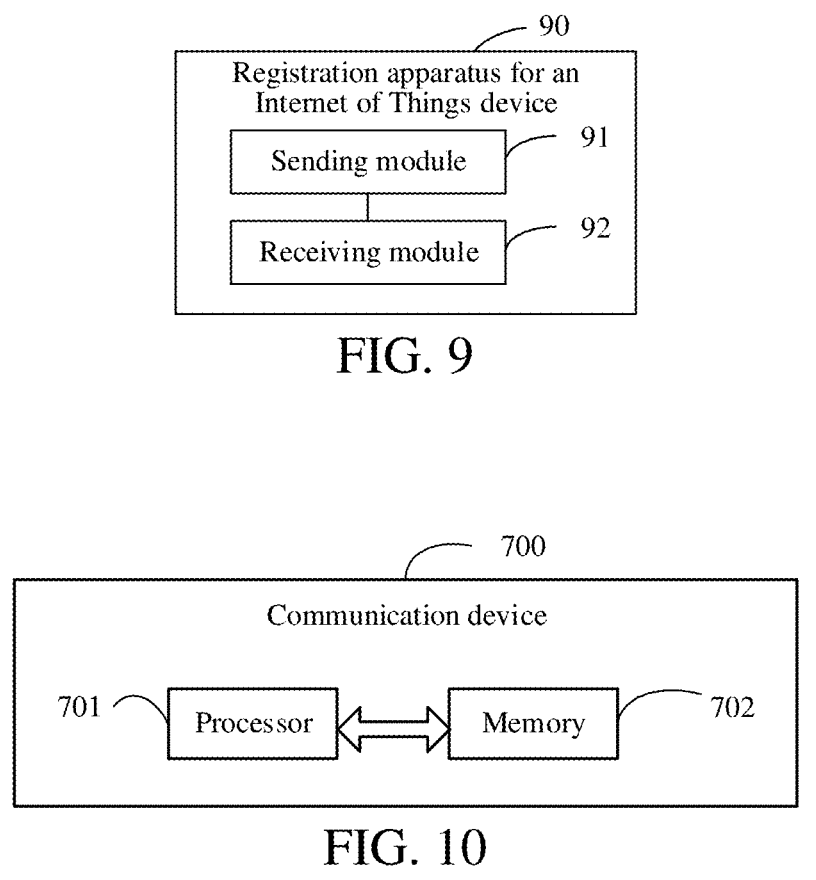

90

Registration apparatus for an
Internet of Things device

Sending module — 91

Receiving module — 92

Communication device

701 — Processor ⟺ Memory — 702

FIG. 10

REGISTRATION METHOD AND APPARATUS FOR INTERNET OF THINGS DEVICE, COMMUNICATION DEVICE, CORE NETWORK DEVICE, STORAGE MEDIUM AND SYSTEM

CROSS-REFERENCE TO RELATED APPLICATIONS

This application is a Bypass Continuation Application of International Patent Application No. PCT/CN2022/140795, filed Dec. 21, 2022, and claims priority to Chinese Patent Application No. 202111583573.8, filed Dec. 22, 2021, the disclosures of which are hereby incorporated by reference in their entireties.

BACKGROUND OF THE INVENTION

Field of the Invention

This application relates to the field of communication technologies, and specifically, to a registration method and apparatus for an Internet of Things device, a communication device, a core network device, a storage medium, and a system.

Description of Related Art

Generally, the 5th generation (5G) mobile communication technology provides a data channel between a user equipment (UE, also referred to as a terminal device or the like) and a data network, so that the UE can access services in the data network. When accessing 5G, the UE needs to send a registration request to a 5G core network through a non-access-stratum (NAS) protocol to be registered in the 5G core network, so that the 5G network can provide services for the UE.

Some Internet of Things devices (such as wearable devices) are used in specific scenarios or specific services, such as electronic meter reading devices and label devices, which are low-cost and large in quantity. If a communication protocol stack of an existing 3rd generation partnership project (3GPP) UE is also supported, the cost of these Internet of Things devices may increase. Therefore, how to implement communication between low-cost Internet of Things devices and the 5G core network to enable a communication network to control and manage Internet of Things devices has become an urgent technical problem to be resolved.

SUMMARY OF THE INVENTION

According to a first aspect, a registration method for an Internet of Things device is provided. The method includes: obtaining, by a target device, first policy information, where the first policy information is used for describing that an Internet of Things device is allowed to access the target device; obtaining, by the target device, an identifier of the Internet of Things device according to the first policy information; and sending, by the target device, a registration request message to a core network device, where the registration request message is used for requesting to register the Internet of Things device into the core network device, and the registration request message includes the identifier of the Internet of Things device.

According to a second aspect, a registration apparatus for an Internet of Things device is provided. The registration apparatus for an Internet of Things device includes: an obtaining module and a sending module. The obtaining module is configured to obtain first policy information, where the first policy information is used for describing that an Internet of Things device is allowed to access a target device; and obtain an identifier of the Internet of Things device according to the first policy information. The sending module is configured to send a registration request message to a core network device. The registration request message is used for requesting to register the Internet of Things device into a core network device. The registration request message includes the identifier of the Internet of Things device.

According to a third aspect, a registration method for an Internet of Things device is provided. The method includes: sending, by a core network device, first policy information to a target device, where the first policy information is used for describing that an Internet of Things device is allowed to access the target device; and receiving, by the core network device, a registration request message from the target device, where the registration request message is used for requesting to register the Internet of Things device into the core network device, and the registration request message includes an identifier of the Internet of Things device.

According to a fourth aspect, a registration apparatus for an Internet of Things device is provided. The registration apparatus for an Internet of Things device includes: a sending module and a receiving module. The sending module is configured to send first policy information to a target device, where the first policy information is used for describing that an Internet of Things device is allowed to access the target device. The receiving module is configured to receive a registration request message from the target device, where the registration request message is used for requesting to register the Internet of Things device into a core network device, and the registration request message includes an identifier of the Internet of Things device.

According to a fifth aspect, a communication device is provided. The communication device includes a processor and a memory. The memory stores a program or instructions executable on the processor. The program or the instructions, when executed by the processor, implement steps of the method according to the first aspect.

According to a sixth aspect, a communication device is provided, including a processor and a communication interface. The processor is configured to obtain first policy information, where the first policy information is used for describing that an Internet of Things device is allowed to access a target device; and obtain an identifier of the Internet of Things device according to the first policy information. The communication interface is configured to send a registration request message to a core network device. The registration request message is used for requesting to register the Internet of Things device into the core network device. The registration request message includes the identifier of the Internet of Things device.

According to a seventh aspect, a core network device is provided. The core network device includes a processor and a memory. The memory stores a program or instructions executable on the processor. The program or the instructions, when executed by the processor, implement steps of the method according to the first aspect.

According to an eighth aspect, a core network device is provided, including a processor and a communication interface. The processor is configured to obtain first policy information, where the first policy information is used for describing that an Internet of Things device is allowed to access a target device; and obtain an identifier of the Internet of Things device. The communication interface is configured to send a registration request message to the core network device. The registration request message is used for requesting to register the Internet of Things device into the core network device. The registration request message includes the identifier of the Internet of Things device.

According to a ninth aspect, a non-transitory readable storage medium is provided. The non-transitory readable storage medium stores a program or instructions. The program or the instructions, when executed by a processor, implement steps of the method according to the first aspect, or implement steps of the method according to the third aspect.

According to a tenth aspect, a communication system is provided, including the registration apparatus for an Internet of Things device according to the second aspect and the registration apparatus for an Internet of Things device according to the fourth aspect; or including the communication device according to the fifth aspect and the core network device according to the seventh aspect; or including the communication device according to the sixth aspect and the core network device according to the eighth aspect.

According to an eleventh aspect, a chip is provided. The chip includes a processor and a communication interface. The communication interface is coupled to the processor. The processor is configured to execute a program or instructions, to implement the method according to the first aspect or the method according to the third aspect.

According to a twelfth aspect, a computer program/program product is provided. The computer program/program product is stored in a non-transitory storage medium. The computer program/program product is executed by at least one processor, to implement steps of the registration method for an Internet of Things device according to the first aspect, or implement steps of the registration method for an Internet of Things device according to the third aspect.

BRIEF DESCRIPTION OF THE DRAWINGS

FIG. 9 is a schematic structural diagram 2 of a registration apparatus for an Internet of Things device according to an embodiment of this application;

FIG. 10 is a schematic diagram of a hardware structure of a communication device according to an embodiment of this application;

DESCRIPTION OF THE INVENTION

The following clearly describes the technical solutions in embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

In the specification and the claims of this application, terms such as "first" and "second" are used to distinguish similar objects, but are not used to describe a specific sequence or order. It should be understood that terms used in such a way is interchangeable in proper circumstances, so that the embodiments of this application described herein can be implemented in other sequences than a sequence illustrated or described herein. In addition, the objects distinguished by "first" and "second" are usually of the same type, and a number of objects is not limited. For example, a number of a first objects may be one or more than one. In addition, "and/or" in this specification and the claims represents at least one of connected objects, and a character "/" generally represents related objects are in an "or" relationship.

It should be noted that technologies described in the embodiments of this application are not limited to a long-term evolution (LTE)/LTE-advanced (LTE-A) system, and may further be applied in other wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. Terms "system" and "network" in the embodiments of this application are often interchangeably used, and the technology described can be applied to the systems and radio technologies mentioned above, and can also be applied to other systems and radio technologies. A new radio (NR) system is described below for example purposes, and NR terminology is used in much of the following description. However, these technologies can also be applied to applications other than NR system applications, such as a 6th generation (6G) communication system.

Figure 1:
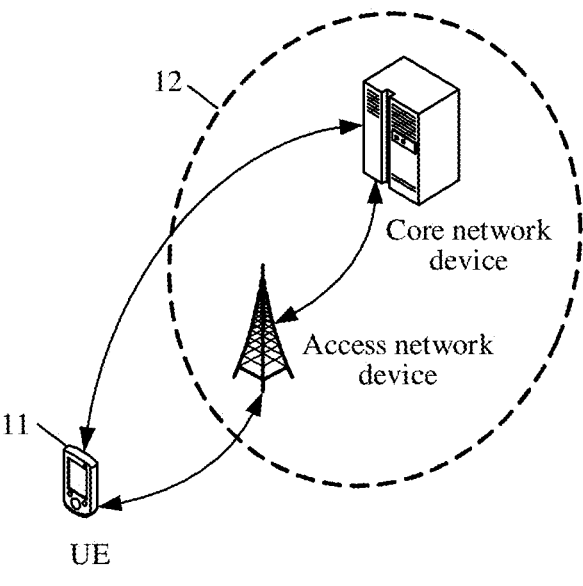
FIG. 1 is a schematic architectural diagram of a wireless communication system according to an embodiment of this application.

FIG. 1 is a block diagram of a wireless communication system to which an embodiment of this application may be applied. The wireless communication system includes a terminal 11 and a network side device 12. The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, a vehicle user equipment (VUE), a pedestrian user equipment (PUE), an intelligent household (household with a wireless communication function, such as a refrigerator, a television, a washing machine, or furniture), a game console, a personal computer (PC), a teller machine, or an automated machine. The wearable device includes: a smart watch, a smart bracelet, a smart earphone, smart glasses, smart jewelry (a smart bangle, a smart wrist chain, a smart ring, a smart necklace, a smart anklet, a smart ankle chain, and the like), a smart wristband, smart clothes, or the like. It should be noted that a specific type of the terminal 11 is not limited in the embodiments of this application. The network side device 12 may include an access network device and/or a core network device. The access network device may also be referred to as a radio access network device, a radio access network (RAN), a radio access network function, or a radio access network unit. The access network device may include a base station. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a transmitting receiving point (TRP), or another proper term in the field. As long as a same technical effect is achieved, the base station is not limited to a specific technical term. The access network device 12 may further include a non-3GPP access technology device, for example, a wireless local area network (WLAN) access point, a wireless fidelity (Wi-Fi) node, a fixed access device, a Bluetooth access device, and the like. It should be noted that the base station in the NR system is only used as an example for description in the embodiments of this application, and a specific type of the base station is not limited. The core network device may include, but is not limited to, at least one of the following: a mobility management entity (MME), an access and mobility management function (AMF), a session management function (SMF), a user plane function (UPF), a policy control function (PCF), a policy and charging rules function (PCRF), an edge application server discovery function (ASDF), a unified data management (UDM), a unified data repository (UDR), a home subscriber server (HSS), a centralized network configuration (CNC), a network repository function (NRF), a network exposure function (NEF), a local NEF (L-NEF), a binding support function (BSF), an application function (AF), or the like. It should be noted that the core network device in the NR system is only used as an example for description in the embodiments of this application, and a specific type of the core network device is not limited. The core network device may also be referred to as a core network node or a core network function.

At present, a 5G system includes a terminal device, an access network device, and a core network device. The 5G system can provide a data channel between the terminal device and a data network, so that the terminal device can access services in the data network. When accessing the 5G system, the terminal device needs to send a registration request to a 5G core network by using a NAS protocol, to register into the 5G core network, so that the 5G network can provide services for the terminal device.

Generally, an Internet of Things (IoT) terminal (device) refers to a terminal device (for example, a smart wearable device) used in some specific scenarios or for specific services. Internet of Things devices may be designed according to services that need to be performed and specific requirements of application programs (for example, smart households, smart cities, smart utilities, and electronic health), and are low-cost and large in quantity. However, because some Internet of Things devices are only used in specific scenarios or for specific services, functions of the Internet of Things devices are simple. To reduce manufacturing costs, it is possible that the Internet of Things devices cannot support a protocol stack (for example, a NAS protocol stack) of an existing terminal device. Therefore, the Internet of Things devices cannot directly communicate with the 5G core network, and the communication network cannot directly control and manage the Internet of Things devices. Therefore, how to implement communication between low-cost Internet of Things devices and the 5G core network to enable a communication network to control and manage Internet of Things devices, has become an urgent technical problem to be resolved.

A passive Internet of Things (PIoT) device refers to an Internet of Things device that does not have a power source and needs to absorb energy (for example, solar energy, wireless signals, and vibration) from a surrounding environment to support communication. The passive Internet of Things device receives an excitation signal, and triggers a reflection signal of the excitation signal, to interact with the communication system, to complete communication. The passive Internet of Things device may be further divided into two scenarios: energy storage and no energy storage. Energy storage means that after absorbing energy, the device can store the energy for subsequent use. No energy storage means that the device cannot store absorbed energy.

The following describes the registration method for an Internet of Things device provided in the embodiments of this application in detail with reference to the accompanying drawings by using some embodiments and application scenarios thereof.

An embodiment of this application provides a target device-assisted registration method for an Internet of Things device. The target device may obtain an identifier of an Internet of Things device according to an access policy of the Internet of Things device, and send a registration request message to a core network device, to enable the Internet of Things device to complete registration into the core network device, so that the Internet of Things device can be registered into the core network device. Therefore, the Internet of Things device can still communicate with the core network device without supporting an existing NAS protocol stack. In this way, communication costs between the Internet of Things device and the core network device are reduced, and the core network device can control and manage the Internet of Things device.

Embodiment 1

Figure 2:
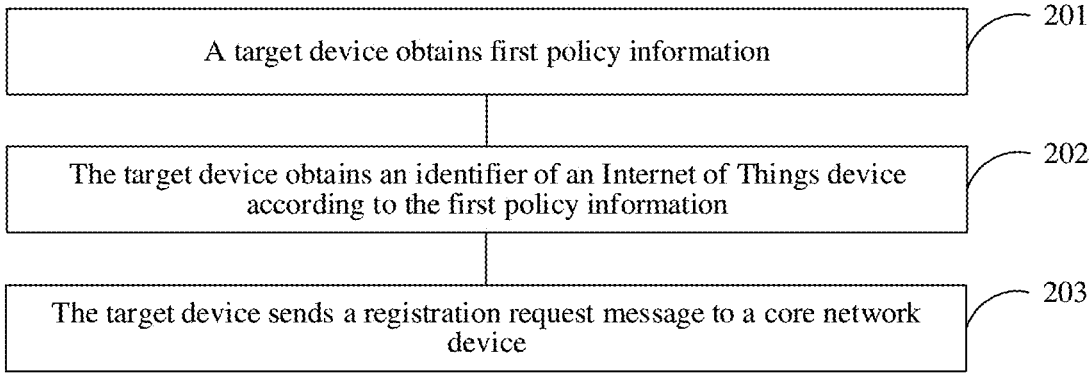
FIG. 2 is a schematic diagram 1 of a registration method for an Internet of Things device according to an embodiment of this application.

An embodiment of this application provides a registration method for an Internet of Things device. FIG. 2 is a flowchart of a registration method for an Internet of Things device according to an embodiment of this application. As shown in FIG. 2, the registration method for an Internet of Things device provided in this embodiment of this application may include the following step 201 to step 203.

Step 201: A target device obtains first policy information.

In this embodiment of this application, the first policy information is used for describing that an Internet of Things device is allowed to access the target device.

It should be noted that the Internet of Things device accessing the target device may include at least one of the following: the target device being used as a reader/writer (sending an excitation signal and receiving a reflection signal from the Internet of Things device) of the Internet of Things device, the target device receiving a reflection signal of the Internet of Things device, the target device sending an excitation signal, the target device transmitting uplink data of the Internet of Things device, the target device transmitting downlink data of the Internet of Things device, the target device transmitting data of the Internet of Things device, the target device being used as a relay of an excitation signal, the target device being used as a relay of a reflection signal, the target device being used as a relay of uplink data of the Internet of Things device, the target device being used as a relay of downlink data of the Internet of Things device, or the target device being used as a relay of data transmission of the Internet of Things device. The various manners for the Internet of Things device to access the target device are also referred to as manners of the Internet of Things device accessing the target device.

Optionally, the first policy information may further include a manner of the Internet of Things device accessing the target device.

Optionally, in this embodiment of this application, the target device may be a UE, or the target device may be a RAN (for example, a base station).

It should be noted that the first policy information (that is, an access policy of the Internet of Things device) may alternatively be used as information indicating that the target device has an Internet of Things device access capability.

Figures 3, 4:
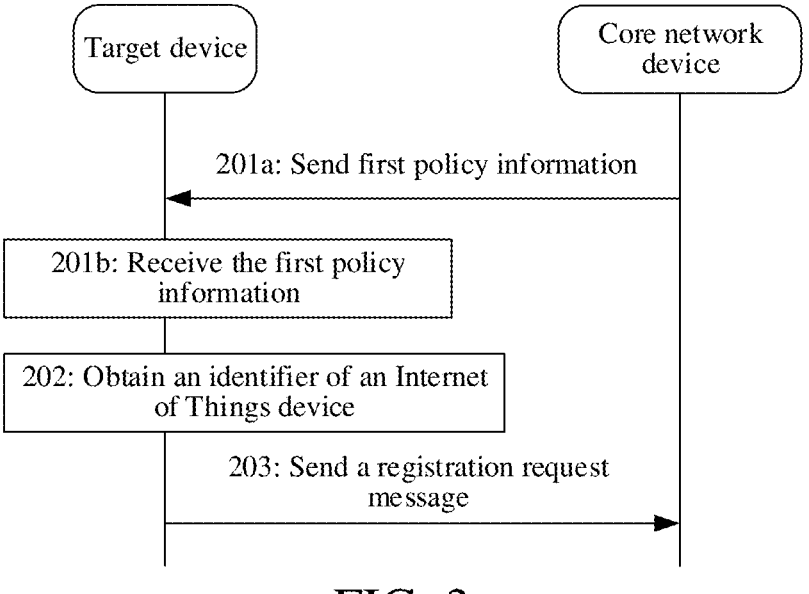
FIG. 3 is a schematic diagram 2 of a registration method for an Internet of Things device according to an embodiment of this application.
FIG. 4 is a schematic diagram 3 of a registration method for an Internet of Things device according to an embodiment of this application.

In a possible implementation, referring to FIG. 2, as shown in FIG. 3, step 201 may be implemented through the following step 201*a* and step 201*b*.

Step 201*a*: A core network device sends first policy information to the target device.

Step 201*b*: The target device receives the first policy information from the core network device.

Optionally, in this embodiment of this application, the first policy information is determined according to target information. The target information includes at least one of the following: subscription information of the target device or configuration information of an operator. The configuration information of an operator may include configuration information of an operator corresponding to the target device, and/or configuration information of an operator corresponding to the core network device.

For example, the target device may receive a NAS message sent by the core network device, and obtain the first policy information from the NAS message. For example, a UE may receive a registration response message sent by an AMF, including the first policy information. The target device is a UE.

For example, the target device may receive a NGAP message sent by the core network device, and obtain the first policy information from the NGAP message. For example, a RAN may receive an NGAP message sent by an AMF, including the first policy information. The target device is a RAN.

Optionally, the access network device may receive Internet of Things device access capability information from the core network device, to indicate that the target device has the Internet of Things device access capability.

For example, the RAN may receive the NGAP message from the AMF, and obtain the Internet of Things device access capability information from the NGAP message, and the Internet of Things device access capability information indicates that the UE has the Internet of Things device access capability.

Optionally, in this embodiment of this application, the target device may further establish a session channel for the Internet of Things device according to a transmission manner of Internet of Things device data in the access policy of the Internet of Things device.

In another possible implementation, step 201 may be implemented through the following step 201*c*.

Step 201*c*: The target device determines the first policy information according to locally stored policy-related configuration information.

It should be noted that the policy-related configuration information may be understood as: configuration information that can be used for determining the first policy information, that is, the policy-related configuration information is configuration information that is locally stored for determining the first policy information.

Optionally, in this embodiment of this application, the policy-related configuration information may be preconfigured, predefined, agreed on in a protocol, autonomously determined by the target device, autonomously determined by an operator, or the like.

In still another possible implementation, in this embodiment of this application, step 201 may be implemented through the following step 201*d* or step 201*e*.

Step 201*d*: The target device receives the first policy information from an access network device.

The target device is a UE. Optionally, the first policy information is determined by the access network device according to an access manner of an Internet of Things device supported by the UE and an access manner of an Internet of Things device supported by the access network device.

For example, the access manner of the Internet of Things device supported by the UE may include at least one of the following: the UE being used as a reader/writer of the Internet of Things device, the UE being used as a device receiving a reflection signal of the Internet of Things device, the UE being used as a device sending an excitation signal to the Internet of Things device, the UE being used as a relay device receiving a reflection signal of the Internet of Things device, or the UE being used as a relay device sending an excitation signal to the Internet of Things device.

Step 201*e*: The target device receives the first policy information from a UE.

The target device is an access network device. Optionally, the first policy information is determined by the UE according to an access manner of an Internet of Things device supported by the UE and an access manner of an Internet of Things device supported by the access network device.

For example, the access manner of the Internet of Things device supported by the access network device may include at least one of the following: the access network device being used as a reader/writer of the Internet of Things device, the access network device being used as a device receiving a reflection signal of the Internet of Things device, the access network device being used as a device sending an excitation signal to the Internet of Things device, the access network device being used as a relay device receiving a reflection signal of the Internet of Things device, or the access network device being used as a relay device sending an excitation signal to the Internet of Things device.

Optionally, in this embodiment of this application, the first policy information may be explicitly indicated/explicitly described, that is, the target device obtains this parameter, namely, the first policy information. Alternatively, the first policy information may be implicitly indicated/implicitly described, for example, the UE and the access network device default the same configuration information, and both allow the Internet of Things device to access the target device by using the same Internet of Things device policy.

In step 201*d* or 201*e*, the access network device or the UE does not need to send the parameter, namely, the first policy information, to the target device. Alternatively, when the access network device or the UE does not send the access policy of the Internet of Things device to the target device, it indicates that the Internet of Things device is not allowed to access the target device.

Optionally, in this embodiment of this application, the first policy information is further used for describing an access manner of the Internet of Things device accessing the target device.

Optionally, in this embodiment of this application, the access manner includes at least one of the following: the target device being used as a reader/writer of the Internet of Things device, the target device being used as a device that receives a reflection signal of the Internet of Things device, the target device being used as a device that sends an excitation signal to the Internet of Things device, the target device being used as a relay device that receives a reflection signal of the Internet of Things device, or the target device being used as a relay device that sends an excitation signal to the Internet of Things device.

Optionally, in this embodiment of this application, the first policy information is further used for describing at least one of the following: a type of an Internet of Things device that allows the target device to access, a signal transmission manner, or a data transmission manner of the Internet of Things device.

Optionally, in this embodiment of this application, the signal transmission manner may include at least one of the following: being used as a reader/writer (sending an excitation signal and receiving a reflection signal from the Internet of Things device) of the Internet of Things device, receiving a reflection signal of the Internet of Things device, sending an excitation signal, being used as a relay of an excitation signal, or being used as relay of a reflection signal.

Step 202: The target device obtains an identifier of the Internet of Things device according to the first policy information.

Optionally, in this embodiment of this application, the identifier of the Internet of Things device may be electronic product code (EPC), an IP address, a MAC address, or other information that identifies the Internet of Things device.

Optionally, in this embodiment of this application, an existence form of the identifier of the Internet of Things device includes at least one of the following: subscription permanent identifier (SUPI), subscription concealed identifier (SUCI), or generic public subscription identifier (GPSI).

Optionally, in this embodiment of this application, in a case that policy information obtained by the target device indicates that the target device is not allowed to access the Internet of Things device, the target device does not perform the step of obtaining the identifier of the Internet of Things device or other following steps. Alternatively, in a case that the policy information obtained by the target device indicates that the target device is not allowed to access the Internet of Things device, and the target device performs the step of obtaining the identifier of the Internet of Things device, when the target device performs other steps, the Internet of Things device cannot be successfully registered into the core network device. For example, the core network device rejects a registration request message of the Internet of Things device from the target device.

In a possible implementation, step 202 may be implemented through the following step 202*a* and step 202*b*.

Step 202*a*: The target device sends an excitation signal to the Internet of Things device.

In this embodiment of this application, the excitation signal is used for triggering the Internet of Things device to send the identifier of the Internet of Things device.

In a possible implementation, the target device sends the excitation signal to the Internet of Things device, to trigger the Internet of Things device to send the identifier of the Internet of Things device to the target device or another device. The target device may be a RAN or a UE.

In another possible implementation, the target device is a RAN. The RAN may send an excitation signal trigger condition to a UE, to trigger the UE to send the excitation signal to the Internet of Things device. The excitation signal trigger condition may include: an excitation signal trigger indication information, used for indicating the UE to send the excitation signal to the Internet of Things device. The excitation signal trigger indication information may be a piece of indication information, or may be an excitation signal sent by the RAN.

It should be noted that in this embodiment of this application, the excitation signal trigger condition may be included in RRC signaling, or the excitation signal trigger condition may be transmitted by using other protocols, which is not limited in this embodiment of this application.

Step 202*b*: The target device receives the identifier of the Internet of Things device from the Internet of Things device.

For example, the target device receives a reflection signal that corresponds to the excitation signal and that is from the Internet of Things device, where the reflection signal includes the identifier of the Internet of Things device; or the target device may receive a message from the Internet of Things device, where the message from the Internet of Things device includes the identifier of the Internet of Things device; or the target device receives a message from another device, where the message includes the identifier of the Internet of Things device.

In a possible implementation, in this embodiment of this application, step 202*b* may be implemented through the following step 202*b*1 or step 202*b*2.

Step 202*b*1: The target device receives, from an access network device, the identifier of the Internet of Things device from the Internet of Things device.

The target device is a UE.

Optionally, after receiving the excitation signal, the Internet of Things device sends the identifier of the Internet of Things device to the RAN. The RAN sends the identifier of the Internet of Things device to the UE. For example, the identifier of the Internet of Things device is included in the reflection signal corresponding to the excitation signal.

Optionally, the UE may receive the excitation signal trigger condition from the RAN, and send the excitation signal to the Internet of Things device after receiving the excitation signal trigger condition.

For example, the UE may receive an RRC message sent by the RAN, and obtain the excitation signal trigger condition from the RRC message; or the UE may receive another protocol message sent by the RAN, and obtain the excitation signal trigger condition from the protocol message.

It should be noted that in step 202*a*, another device different from the target device may alternatively send an excitation signal to the Internet of Things device. For example, the RAN sends the excitation signal to the Internet of Things device, so that the Internet of Things device can send the reflection signal of the excitation signal to the RAN. The reflection signal includes the identifier of the Internet of Things device. The RAN may send the identifier of the Internet of Things device to the UE.

Step 202*b*2: The target device receives, from the UE, the identifier of the Internet of Things device from the Internet of Things device.

The target device is an access network device.

For example, the RAN sends the excitation signal to the Internet of Things device, and then the Internet of Things device may send the reflection signal of the Internet of Things device to the UE according to the excitation signal, where the reflection signal includes the identifier of the Internet of Things device, and then the UE may send the identifier of the Internet of Things device to the RAN.

It should be noted that in step 202*a*, another device different from the target device may alternatively send an excitation signal to the Internet of Things device. For example, the UE sends the excitation signal to the Internet of Things device, so that the Internet of Things device can send the reflection signal of the excitation signal to the UE. The reflection signal includes the identifier of the Internet of Things device. The UE sends the identifier of the Internet of Things device to the RAN.

Optionally, the RAN sends the excitation signal trigger condition to the UE, so that the UE can send the excitation signal to the Internet of Things device after receiving the excitation signal trigger condition, and then the Internet of Things device may send the reflection signal corresponding to the excitation signal to the UE according to the excitation signal, and the UE sends the identifier of the Internet of Things device to the RAN.

For example, the RAN sends the RRC message to the UE, where the RRC message includes the excitation signal trigger condition, and the UE may obtain the excitation signal trigger condition from the RRC message; or the RAN may send another protocol message to the UE, to send the excitation signal trigger condition to the UE through the another protocol message, so that the UE may obtain the excitation signal trigger condition from the another protocol message.

In another possible implementation, in this embodiment of this application, step 202*b* may be implemented through the following step 202*b*3.

Step 202*b*3: The target device receives the reflection signal that corresponds to the excitation signal and that is from the Internet of Things device.

In this embodiment of this application, the reflection signal includes the identifier of the Internet of Things device.

It should be noted that in step 202*a*, another device different from the target device may alternatively send an excitation signal to the Internet of Things device. For example, the UE sends the excitation signal to the Internet of Things device, and the Internet of Things device sends the reflection signal of the excitation signal to the RAN. The reflection signal includes the identifier of the Internet of Things device. Alternatively, the RAN sends the excitation signal to the Internet of Things device, and the Internet of Things device sends the reflection signal of the excitation signal to the UE. The reflection signal includes the identifier of the Internet of Things device.

Optionally, in this embodiment of this application, the target device may determine, according to the first policy information or locally stored configuration information related to policy information, a manner for the target device to obtain the identifier of the Internet of Things device.

Step 203: The target device sends a registration request message to a core network device.

In this embodiment of this application, the registration request message is used for requesting to register the Internet of Things device into the core network device. The registration request message includes the identifier of the Internet of Things device.

Optionally, in this embodiment of this application, the registration request message further includes an identifier of the target device.

Optionally, in this embodiment of this application, the registration request message further includes the first indication information. The first indication information is used for indicating to register the Internet of Things device into the core network device.

Optionally, in this embodiment of this application, the target device is an access network device, and the registration request message further includes a first identifier. The first identifier is an identifier allocated by the access network device for the Internet of Things device, and used for indicating the Internet of Things device on an interface between the access network device and the core network device.

It should be noted that the identifier of the Internet of Things device in the registration request message may be the same as or different from the identifier of the Internet of Things device obtained by the target device. For example, identifier information of the Internet of Things obtained by the target device is EPC, the identifier of the Internet of Things device in the registration request message is the EPC, and a communication network stores a correspondence between the EPC of the Internet of Things device and SUPIs. In another example, the identifier information of the Internet of Things obtained by the target device is EPC, and the identifier of the Internet of Things device included in the registration request message is: an identifier converted into subscription concealed identifier SUCI format or an identifier converted into subscription permanent identifier SUPI format.

In a possible implementation, the target device may convert the identifier of the Internet of Things device into SUPI format according to the following logic: a type indicated by the SUPI is an international mobile subscriber identification number (IMSI), SUPI includes mobile country code (MCC) and mobile network code (MNC) of an operator to which the UE belongs, and a part of the identifier or the entire identifier of the Internet of Things device obtained by the UE is used as a mobile subscriber identification number (MSIN) in the IMSI.

In another possible implementation, the target device may convert the identifier of the Internet of Things device into SUPI format according to the following logic: the type indicated by the SUPI is an Internet of Things, and the SUPI includes the MCC and the MNC of the operator to which the UE belongs, and a part of the identifier or the entire identifier of the Internet of Things device obtained by the UE.

In still another possible implementation, the target device may convert the identifier of the Internet of Things device into SUPI format according to the following logic: the type indicated by the SUPI is a network specific identifier (NSI), and the SUPI may use a username@realm format, where a username part includes a part of the identifier or the entire identifier of the Internet of Things device obtained by the UE, and a realm part includes a domain of the Internet of Things device.

For example, the domain of the Internet of Things device may be a part of the identifier of the Internet of Things device obtained by the UE. If the identifier of the Internet of Things device obtained by the UE includes information about an entity or an operator to which the Internet of Things device belongs, this part may be placed in the part realm.

In still another possible implementation, the target device may convert the identifier of the Internet of Things device into SUPI format according to the following logic: the type indicated by the SUPI is an Internet of Things, and the SUPI uses the username@realm format, where a username part includes a part of the identifier or the entire identifier of the Internet of Things device obtained by the UE, and a realm part includes a domain of the Internet of Things device.

For example, the domain of the Internet of Things device may be a part of the identifier of the Internet of Things device obtained by the UE. For example, if the identifier of the Internet of Things device obtained by the UE includes information about an entity or an operator to which the Internet of Things device belongs, this part may be placed in the part realm.

Optionally, in this embodiment of this application, in a case that the target device is a UE, the registration request message of the Internet of Things device includes a UE identifier and the identifier of the Internet of Things device, and may further carry an Internet of Things registration indication, to indicate registration for the Internet of Things device. The registration request message may be a registration request message, or may be another NAS message.

Optionally, the registration request message may include a registration type, whose value is indicated as Internet of Things registration.

Optionally, in this embodiment of this application, in a case that the target device is a RAN, the registration request message of the Internet of Things device includes a RAN identifier and the identifier of the Internet of Things device, and may further carry a registration indication of the Internet of Things device, to indicate registration for the Internet of Things device. The registration request message of the Internet of Things device may be an NGAP protocol message, a NAS protocol message, or another protocol message (for example, an initial Passive Internet of Things (PIoT) message). The registration request message may further include a registration parameter of the Internet of Things device, and the registration request message may include an access type, whose value is indicated as Internet of Things registration.

Optionally, in this embodiment of this application, the registration request message of the Internet of Things device may include the UE identifier and the identifier of the Internet of Things device.

It should be noted that a registration response message of the Internet of Things device and the registration request message of the Internet of Things device may be messages of the same protocol, for example, an NGAP protocol message, a NAS protocol message, or other protocol messages.

An embodiment of this application provides a registration method for an Internet of Things device. In this embodiment of this application, the target device may obtain the identifier of the Internet of Things device after obtaining the first policy information. The first policy information is used for describing that the Internet of Things device is allowed to access the target device. Therefore, the target device may send the registration request message to the core network device. The registration request message is used for requesting to register the Internet of Things device into the core network device. The registration request message includes the identifier of the Internet of Things device. In this way, registration of the Internet of Things device into the 5G core network can be completed with assistance of the target device, which reduces communication costs between the Internet of Things device and the core network device, and enables the core network device to control and manage the Internet of Things device.

Optionally, in this embodiment of this application, before step 201, the registration method for an Internet of Things device provided in this embodiment of this application further includes step 200.

Step 200: The target device sends capability information to a core network device.

In this embodiment of this application, the capability information is used for describing that the target device supports the Internet of Things device accessing a communication network through the target device.

Alternatively, the capability information may be used for indicating that the Internet of Things device may access the communication network or the core network device from the target device.

That the Internet of Things device may access the access the communication network or the core network device from the target device indicates that the target device supports an Internet of Things device access capability. For example, the target device may be used as a reader/writer scanning the Internet of Things device; or the target device may establish a protocol data unit (PDU) session for the Internet of Things device, to transmit data of the Internet of Things device. For details, refer to the following description of Internet of Things device access capability information.

Optionally, in this embodiment of this application, the target device may send capability information to an AMF, and then the AMF sends the capability information to a UDM/PCF, so that the target device can obtain the first policy information.

Optionally, in this embodiment of this application, in a case that the target device is a UE, the UE may send the Internet of Things device access capability information of the UE to the AMF through a NAS message (for example, the UE may send the Internet of Things device access capability information of the UE to the AMF through the registration request message); or the UE may send the Internet of Things device access capability information of the UE to the AMF through the RAN (for example, the UE may first send the Internet of Things device access capability information of the UE to the RAN through a radio resource control (RRC) message; and then the RAN sends the Internet of Things device access capability information of the UE to the AMF through a new generation application protocol (NGAP) message).

Optionally, in this embodiment of this application, in a case that the target device is a RAN, the RAN may send the Internet of Things device access capability information of the RAN to the AMF.

Optionally, in this embodiment of this application, the Internet of Things device access capability information may include at least one of the following: a type of an Internet of Things supported by the target device, an identifier of a third party to which the target device belongs, a signal sending or transmission manner supported by the target device, or a transmission manner of data of the Internet of Things device supported by the target device.

Optionally, in this embodiment of this application, the type of the Internet of Things supported by the target device may include a service type (for example, an environmental monitoring type, a label tracking type, and a material management type) of the Internet of Things, and/or a type (for example, a sensor or a label) of the Internet of Things devices.

It should be noted that the identifier of the third party to which the target device belongs may be understood as: when the third party disposes the target device as the reader/writer of the Internet of Things device, the target device has the identifier of the third party that disposes the target device. In this case, the target device may support access of an Internet of Things device of the third party.

Optionally, in this embodiment of this application, the signal sending or transmission manner supported by the target device includes at least one of the following: being used as a reader/writer (sending an excitation signal and receiving a reflection signal) of the Internet of Things device, receiving a reflection signal from the Internet of Things device, sending an excitation signal, being used as a relay device of an excitation signal, or being used as relay device of a reflection signal.

Optionally, in this embodiment of this application, the transmission manner of the data of the Internet of Things device supported by the target device includes at least one of the following: transmitting uplink data of the Internet of Things device, transmitting downlink data of the Internet of Things device, transmitting the data of the Internet of Things device, being used as a relay of the uplink data of the Internet of Things device, being used as a relay of the downlink data of the Internet of Things device, being used as a relay of data transmission of the Internet of Things device, transmitting the data of the Internet of Things device in a group manner, or used as a relay transmitting the data of the Internet of Things device in a group manner.

In this embodiment of this application, the target device may send the capability information to the core network device, to indicate that the Internet of Things device may access the core network device from the target device, so that the core network device may send, according to the capability information, an access policy of the Internet of Things device corresponding to the capability information to the target device. In this way, the core network device may control and manage the Internet of Things device.

Embodiment 2

An embodiment of this application provides a registration method for an Internet of Things device. FIG. 4 is a flowchart of a registration method for an Internet of Things device according to an embodiment of this application. As shown in FIG. 4, the registration method for an Internet of Things device provided in this embodiment of this application may include the following step 401 and step 402.

Step 401: A core network device sends first policy information to a target device.

In this embodiment of this application, the first policy information is used for describing that an Internet of Things device is allowed to access the target device.

Optionally, in this embodiment of this application, the core network device includes at least one of the following: a UDM, an AMF, or a PCF.

Optionally, in this embodiment of this application, before step 401, the registration method for an Internet of Things device provided in this embodiment of this application further includes the following step 4001.

Step 4001: The core network device determines the first policy information according to target information.

In this embodiment of this application, the target information includes at least one of the following: subscription information of the target device or configuration information of an operator corresponding to the target device.

In a possible implementation, the core network device is an AMF, and the AMF determines the first policy information according to the target information. The subscription information of the target device may be from the UDM, and the configuration information of an operator may be stored in the AMF, or may be from the UDM/PCF.

In another possible implementation, the core network device is a UDM, and the UDM determines the first policy information according to the target information. The UDM sends the first policy information to the AMF, and the AMF sends the first policy information to the target device.

In still another possible implementation, the core network device is a PCF, and the PCF determines the first policy information according to the target information. The PCF sends the first policy information to the AMF, and the AMF sends the first policy information to the target device.

For example, the UDM sends a registration (Nudm_UECM_Registration) response message to the AMF, or obtains a subscription (Nudm_SDM_Get) response message. The registration response message or the subscription response message carries an access policy of the Internet of Things device.

For example, the PCF sends the first policy information to the AMF in a process of establishing or modifying access and mobility (AM) policy association.

For example, the PCF sends an access and mobility policy control service create (Npcf_AMPolicyControl_Create) response message to the AMF, or the PCF sends an access and mobility policy control service update (Npcf_AMPolicyControl_Update) response message to the AMF. The access and mobility policy control service create response message or the access and mobility policy control service update response message carries the first policy information.

It should be noted that because the core network device has a plurality of network elements, different network elements may respectively determine access policies of some Internet of Things devices. That is, the access policies of the Internet of Things devices may be respectively determined by different network elements.

It should be noted that in the foregoing embodiment of this application, in a possible implementation, the UDM/PCF determines the Internet of Things device that the UE and/or the RAN are allowed to access and/or a transmission manner of data of the Internet of Things device. The target device may be a UE or a RAN.

In another possible implementation, the UE and the RAN may negotiate a signal sending or transmission manner.

In an implementation in which the UE and the RAN negotiate the signal sending or transmission manner, the UE sends a signal sending or transmission manner supported by the UE to the RAN. The RAN determines the signal sending or transmission manner according to the signal sending or transmission manner supported by the UE and the signal sending or transmission manner supported by the RAN, and sends the determined signal sending or transmission manner to the UE. For example, the interaction between the UE and the RAN may be performed through an RRC message, or may be performed through another protocol message. The interaction between the UE and the RAN may be performed simultaneously with step 201 to step 402, or may be separately performed.

Optionally, in this embodiment of this application, before step 401, the registration method for an Internet of Things device provided in this embodiment of this application further includes the following step 40001.

Step 40001: The core network device receives capability information from the target device.

In this embodiment of this application, the capability information is used for describing that the target device supports the Internet of Things device accessing a communication network through the target device.

Optionally, in this embodiment of this application, the AMF sends a registration message to the UDM, or obtains a subscription request message. The registration message or the subscription request information carries Internet of Things device access capability information of the UE.

Optionally, in this embodiment of this application, the AMF carries the Internet of Things device access capability information of the UE in an establishing or modifying request of the AM Policy Association. For example, the AMF sends an access and mobility policy control service create message or an access and mobility policy control service update request message, carrying the Internet of Things device access capability information of the UE.

Optionally, in this embodiment of this application, the AMF also sends Internet of Things device access capability information of the RAN to the UDM/PCF.

Step 402: The core network device receives a registration request message from the target device.

In this embodiment of this application, the registration request message is used for requesting to register the Internet of Things device into the core network device. The registration request message includes an identifier of the Internet of Things device.

Optionally, in this embodiment of this application, the AMF receives the registration request message from the target device, and sends the registration request message to the UDM, to identify that the AMF serves the Internet of Things device. The registration request message of the Internet of Things device includes identifier information of the Internet of Things device and identifier information of the target device, where the identifier information of the target device is used for indicating that the Internet of Things device accesses the core network device from the target device; and then the UDM may send subscription information of the Internet of Things device to the AMF according to the registration request message of the target device, so that the AMF may send a registration acceptance message to the target device, to indicate that the Internet of Things device has been successfully registered into the core network device through the target device.

Optionally, in this embodiment of this application, the subscription information of the Internet of Things device includes at least one of the following: an identifier of the Internet of Things device in a 3GPP system, access and mobility subscription information, registration subscription information, slice subscription information, data network subscription information, SMF selection information, quality of service (QoS) subscription information, or the like.

Optionally, in this embodiment of this application, the AMF may alternatively obtain the subscription information of the Internet of Things device through the configuration information. In addition, if the AMF obtains the subscription information of the Internet of Things device through the configuration information, the AMF does not need to obtain the subscription information of the Internet of Things device from the UDM.

Optionally, in this embodiment of this application, the registration acceptance message includes the identifier of the target device and the identifier of the Internet of Things device.

Optionally, in this embodiment of this application, the registration acceptance message further carries an Internet of Things registration success indication, to indicate that the Internet of Things device has been successfully registered into the core network device through the target device.

Optionally, in this embodiment of this application, the AMF may be identifier information (for example, AMF NGAP PIoT ID) allocated by the Internet of Things device on an NGAP interface and used for representing the Internet of Things device. In addition, the AMF stores an association relationship between the obtained identifier of the Internet of Things device and the identifier information on the NGAP interface used for representing the Internet of Things device.

It should be noted that step 401 and step 402 may alternatively be implemented after the target device completes registration, which is not limited in this embodiment of this application.

This embodiment of this application provides a registration method for an Internet of Things device. The core network device may send first policy information to the target device, so that the target device may obtain the identifier of the Internet of Things device according to the first policy information after obtaining the first policy information. The first policy information is used for describing that the Internet of Things device is allowed to access the target device. Therefore, the target device may request to the core network device to register the Internet of Things device into the core network device. In this way, registration of the Internet of Things device in a 5G core network may be completed with assistance of the target device, which reduces communication costs between the Internet of Things device and the core network device, and enables the core network device to control and manage the Internet of Things device.

The registration method for an Internet of Things device provided in the embodiments of this application is described below with detailed interactive implementations.

Figures 5, 6:
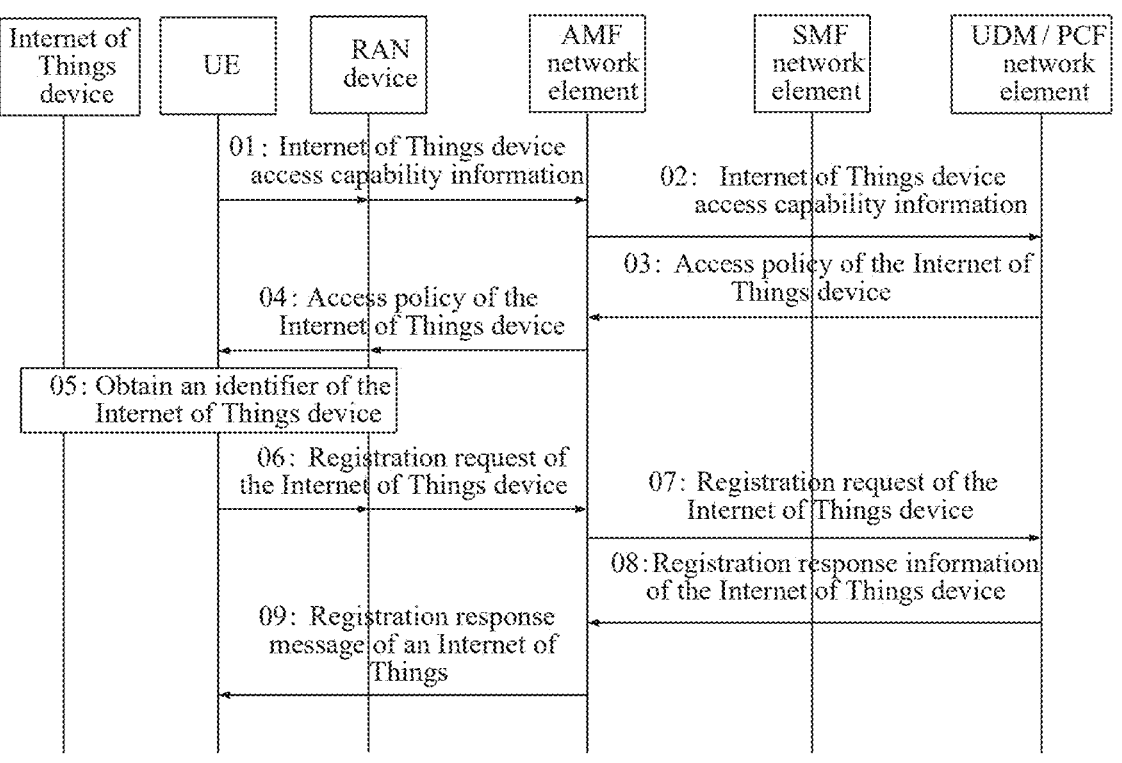
FIG. 5 is a schematic diagram 4 of a registration method for an Internet of Things device according to an embodiment of this application.
FIG. 6 is a schematic diagram 5 of a registration method for an Internet of Things device according to an embodiment of this application.

An embodiment of this application provides a registration method for an Internet of Things device. FIG. 5 is an interaction flowchart of a registration method for an Internet of Things device according to an embodiment of this application. As shown in FIG. 5, the registration method for an Internet of Things device provided in this embodiment of this application may include the following step 01 to step 09.

Step 01. A UE sends Passive IoT device access capability information of the UE to an AMF, indicating that the Passive IoT device may access a 5G network from the UE. For example, the UE may be a reader/writer, scanning the Passive IoT device; or the UE may establish a PDU session for the Passive IoT device, transmitting data of the Passive IoT.

The Passive IoT device access capability information of the UE may include at least one of the following: a Passive IoT type supported by the UE, an identifier of a third party to which the UE belongs, a signal sending or transmission manner supported by the UE, or a transmission manner of the data of the Passive IoT device supported by the UE.

The Passive IoT type may include a Passive IoT service type (for example, environmental monitoring, label tracking, and material management) and/or a Passive IoT device type (for example, a sensor or a label).

The identifier of the third party to which the UE belongs may be understood as: when the third party disposes the UE as the reader/writer of the Passive IoT device, the UE has the identifier of the third party that disposes the UE. In this case, the UE may support access of a Passive IoT device of the third party.

The signal sending or transmission manner includes at least one of the following: being used as a reader/writer (sending an excitation signal and receiving a reflection signal from the Passive IoT device) of the Passive IoT device, receiving a reflection signal of the Passive IoT device, sending an excitation signal, being used as a relay of an excitation signal, or being used as relay of a reflection signal.

The supported transmission manner of the data of the Passive IoT device includes at least one of the following: transmitting uplink data of the Passive IoT device, transmitting downlink data of the Passive IoT device, transmitting the data of the Passive IoT device, being used as a relay of the uplink data of the Passive IoT device, being used as a relay of the downlink data of the Passive IoT device, being used as a relay of data transmission of the Passive IoT device, transmitting the data of the PIoT device in a group manner, or used as a relay transmitting the data of the PIoT device in a group manner.

In a possible implementation, the UE sends the Passive IoT device access capability information to the AMF through a NAS message. For example, the UE may send the Passive IoT device access capability information of the UE through a registration message. Optionally, the UE may alternatively send the Passive IoT device access capability information of the UE in an RRC message to a RAN.

In another possible implementation, the UE may send the Passive IoT device access capability information of the UE to the AMF through the RAN. For example, the UE sends the Passive IoT device access capability information of the UE to the RAN through the RRC message; and the RAN sends the Passive IoT device access capability information of the UE to the AMF through an NGAP message.

In the foregoing two possible implementations, the RAN may alternatively send PIoT device access capability information of the RAN to the AMF.

The Passive IoT device access capability information of the RAN may include at least one of the following: a Passive IoT type supported by the RAN, an identifier of a third party with which the RAN is associated, a signal sending or transmission manner supported by the RAN, or a transmission manner of data of Passive IoT device supported by the RAN.

The third party with which the RAN is associated may be understood as: the RAN may support access of a Passive IoT device of the third party.

Step 02. The AMF sends the Passive IoT device access capability information of the UE to a UDM/PCF.

For example, the AMF sends an Nudm_UECM_Registration or Nudm_SDM_Get request to the UDM, which carries the Passive IoT device access capability information of the UE.

For example, the AMF carries the Passive IoT device access capability information of the UE in an establishing or modifying request of AM Policy Association. For example, the AMF sends an Npcf_AMPolicyControl_Create or Npcf_AMPolicyControl_Update request to the PCF, which carries the Passive IoT device access capability information of the UE.

Optionally, the AMF further sends the Passive IoT device access capability information of the RAN to the UDM/PCF.

Step 03. The UDM/PCF sends an access policy of the Passive IoT device to the AMF.

The access policy of the Passive IoT device is used for describing whether to allow the UE and/or the RAN to access the Passive IoT device, and how to access the Passive IoT device. Accessing the Passive IoT device may include at least one of the following: being used as a reader/writer (sending an excitation signal and receiving a reflection signal from the Passive IoT device) of the Passive IoT device, receiving a reflection signal of the Passive IoT device, sending an excitation signal, transmitting uplink data of the Passive IoT device, transmitting downlink data of the Passive IoT device, transmitting data of the Passive IoT device, being used as a relay of an excitation signal, being used as a relay of a reflection signal, being used as a relay of the uplink data of the Passive IoT device, being used as a relay of the downlink data of the Passive IoT device, or being used as relay of data transmission of the Passive IoT device.

The access policy of the Passive IoT device may describe at least one piece of the following information: a PIoT device that the UE and/or the RAN are allowed to access, the signal sending or transmission manner, and the transmission manner of the data of the Passive IoT device.

The PIoT device that the UE and/or the RAN are allowed to access may include at least one of the following: the UE and/or the RAN being not allowed to access the Passive IoT device, the UE and/or the RAN being allowed to access the Passive IoT device, a type of the Passive IoT device which the UE and/or the RAN are allowed to access, or an identifier of a third party of the Passive IoT which the UE and/or the RAN are allowed to access.

The signal sending or transmission manner may include at least one of the following: the UE being used as a reader/writer (the UE sending an excitation signal and receiving a reflection signal from the Passive IoT device) of the Passive IoT device, the UE receiving a reflection signal of the Passive IoT device, the UE sending an excitation signal, the UE being used as a relay of an excitation signal, the UE being used as relay of a reflection signal, the RAN being used as a reader/writer of the Passive IoT device, the RAN receiving a reflection signal of the Passive IoT device, or the RAN sending an excitation signal.

The transmission manner of the data of the Passive IoT device may include at least one of the following: the UE transmitting uplink data of the Passive IoT device, the UE transmitting downlink data of the Passive IoT device, the UE transmitting data of the Passive IoT device, the UE sending identifier information of the PIoT device to the RAN, the RAN sending the identifier information of the PIoT device to the UE, the UE registering the PIoT device, the RAN registering the PIoT device, the RAN transmitting the uplink data of the Passive IoT device, the RAN transmitting the downlink data of the Passive IoT device, or the RAN transmitting the data of the Passive IoT device.

It should be noted that the access policy of the Passive IoT device may be implicitly expressed. For example, the UE, the RAN, and a network side have consistent configuration information, allowed to access the Passive IoT device by using a policy; or when the network side does not send the access policy of the Passive IoT device, it indicates that the UE and/or the RAN are not allowed to access the Passive IoT device.

Optionally, the UDM/PCF determines the access policy of the Passive IoT device of the UE according to subscription data of the UE and/or operator configuration information.

For example, the UDM sends an Nudm_UECM_Registration or Nudm_SDM_Get response to the AMF, which carries the access policy of the Passive IoT device.

For example, the PCF sends the access policy of the Passive IoT device of the UE to the AMF in an establishing or modifying process of the AM Policy Association. For example, the PCF sends an Npcf_AMPolicyControl_Create or Npcf_AMPolicyControl_Update response to the AMF, which carries the access policy of the Passive IoT device of the UE.

Step 04. The AMF sends the access policy of the Passive IoT device to the UE.

In a possible implementation, the AMF sends the access policy of the Passive IoT device to the UE through the NAS message. For example, the AMF may send the access policy of the Passive IoT device to the UE through a registration response message. Optionally, the AMF may alternatively send Passive IoT device access capability information to the RAN, indicating that the UE has a Passive IoT device access capability.

In another possible implementation, the AMF may send the access policy of the Passive IoT device to the UE through the RAN. For example, the AMF sends the access policy of the Passive IoT device to the RAN through the NGAP message; and the RAN sends the access policy of the Passive IoT device to the UE through the RRC message. Optionally, the AMF may alternatively send the Passive IoT device access capability information to the RAN through the NGAP message, indicating that the UE has the Passive IoT device access capability. It should be noted that the access policy of the Passive IoT device may also be used as information indicating that the UE has the Passive IoT device access capability.

It should be noted that steps 1 to 4 are optional. For example, the UE and/or the RAN may alternatively obtain the access policy of the Passive IoT device through configuration.

It should be noted that different network elements in a network may be used to respectively determine a part of the access policy of the Passive IoT device. For example, the UDM/PCF determines the PIoT device that the UE and/or the RAN are allowed to access and/or the transmission manner of the data of the Passive IoT device; and the UE and the RAN negotiate the signal sending or transmission manner.

For example, in an implementation in which the UE and the RAN negotiate the signal sending or transmission manner, the UE sends the signal sending or transmission manner supported by the UE to the RAN. The RAN determines the signal sending or transmission manner according to the signal sending or transmission manner supported by the UE and the signal sending or transmission manner supported by the RAN, and sends the determined signal sending or transmission manner to the UE. The interaction between the UE and the RAN may be performed through the RRC message, or may be performed through another protocol message. The interaction between the UE and the RAN may be performed simultaneously with step 1 and step 4, or may not have a binding relationship.

Step 05. The UE obtains an identifier of the Passive IoT device.

Figure 7:
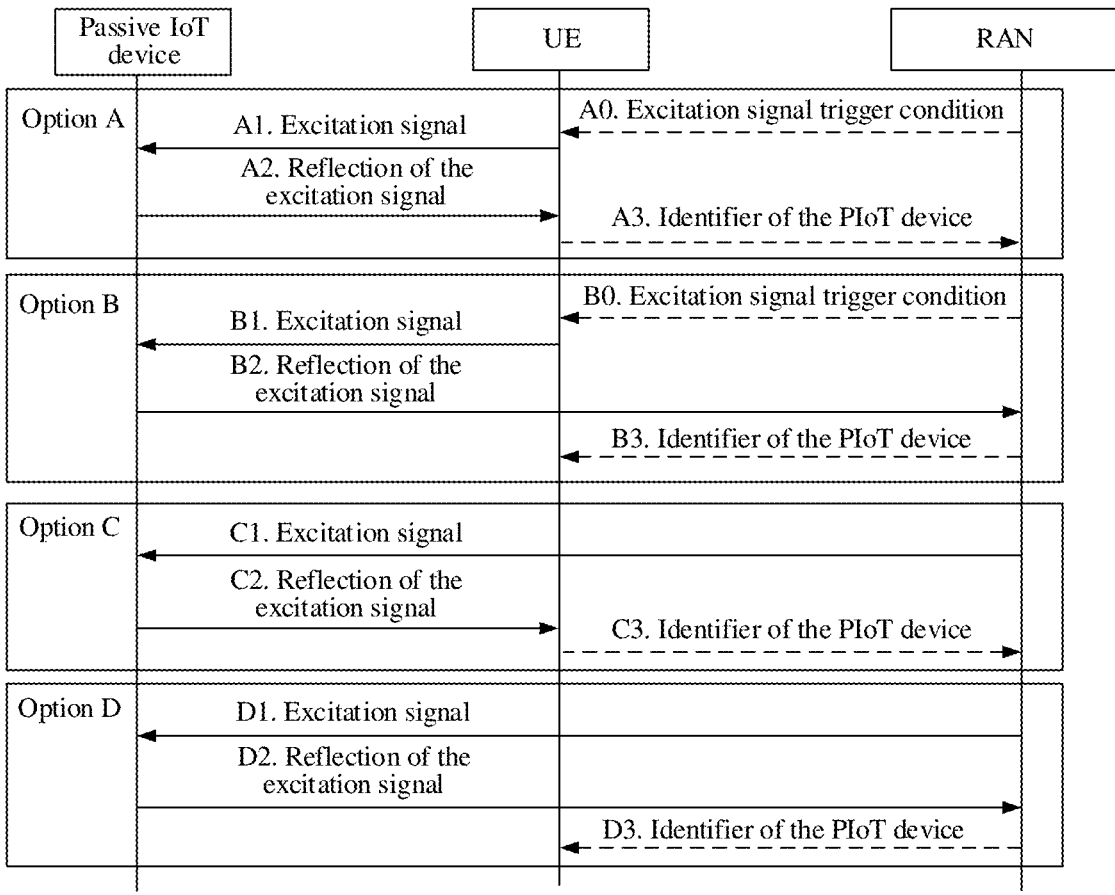
FIG. 7 is a schematic diagram of a manner of obtaining an identifier of an Internet of Things device by a target device according to an embodiment of this application.

For detailed description of a manner of the UE obtaining the identifier of the Passive IoT device, refer to description of a manner shown in FIG. 7.

It should be noted that if in step 4, the access policy of the Passive IoT device indicates that the UE is not allowed to access the Passive IoT device, steps 5 to 9 are not performed. Alternatively, if in this case, step 5 is performed, in any one of steps 6 to 8, the network side (the AMF or the UDM) determines that registration of the PIoT fails.

Step 06. The UE sends a registration request message of the PIoT device to the AMF, to indicate registration for the PIoT device.

For example, the registration request message of the PIoT device includes a UE ID and a PIoT device ID. Optionally, a PIoT registration indication is further carried, to indicate registration for the PIoT device.

The registration request message of the PIoT device may be a registration request message, or may be another NAS message. Optionally, the registration request message of the PIoT device may include a registration type, whose value is indicated as the PIoT registration.

It should be noted that the PIoT device ID may be the same as or different from the identifier of the Passive IoT device obtained by the UE in step 5. Optionally, the UE may convert the identifier of the Passive IoT device obtained in step 5 according to a form defined by the 3GPP, for example, converting according to an SUPI or SUCI format.

For example, the following provides several manners of converting according to the SUPI form:

(1) A SUPI type is indicated as an IMSI, and the SUPI includes MCC and MNC of the operator to which the UE belongs, and uses a part of the identifier or the entire identifier of the Passive IoT device obtained by the UE as a mobile subscriber identification number (MSIN) in the IMSI.

(2) The SUPI type is indicated as the PIoT, and the SUPI includes the MCC and the MNC of the operator to which the UE belongs, and a part of the identifier or the entire identifier of the Passive IoT device obtained by the UE.

(3) The SUPI type is indicated as a network specific identifier (NSI), and the SUPI uses a username@realm format, where a username part includes a part of the identifier or the entire identifier of the Passive IoT device obtained by the UE, and a realm part includes a domain of the Passive IoT device. For example, the domain of the Passive IoT device may be a part of the identifier of the Passive IoT device obtained by the UE. For example, the identifier of the Passive IoT device obtained by the UE includes information indicating an entity or operator to which the PIoT device belongs; and this part may be placed in the realm part.

(4) The SUPI type is indicated as the PIoT, and the SUPI uses the username@realm format, where a username part includes a part of the identifier or the entire identifier of the Passive IoT device obtained by the UE, and a realm part includes the domain of the Passive IoT device. For example, the domain of the Passive IoT device may be a part of the identifier of the Passive IoT device obtained by the UE. For example, the identifier of the Passive IoT device obtained by the UE includes information indicating an entity or operator to which the PIoT device belongs; and this part may be placed in the realm part.

Step 07. The AMF sends the registration request message of the PIoT device to the UDM, indicating that the AMF serves the PIoT device.

The registration request message of the PIoT device includes the identifier information of the Passive IoT device. Optionally, the registration request message of the PIoT device further includes identifier information of the UE, used for indicating that the PIoT device accesses a network through the UE.

Step 08. The UDM sends subscription information of the PIoT device to the AMF.

The subscription information of the PIoT device may include at least one of the following: an identifier of the PIoT device in a 3GPP system, access and mobility subscription information, registration subscription information, slice subscription information, data network subscription information, SMF selection information, or QoS subscription information.

It should be noted that the identifier of the PIoT device in the 3GPP system may be the same as or different from the identifier information of the Passive IoT device. The identifier of the PIoT device in the 3GPP system may exist in at least one of the following forms: an SUPI, an SUCI, or a GPSI. For example, the identifier information of the PIoT device obtained by the UE is EPC, the UDM includes a correspondence between the EPC and the SUPI of the PIoT device, and the UDM sends the SUPI of the PIoT device to the AMF in step 8.

It should be noted that steps 7 and 8 are both optional steps. For example, the AMF may obtain the foregoing subscription information through configuration, and does not need to obtain the subscription information from the UDM.

Step 09. The AMF sends a registration acceptance message of the PIoT to the UE, indicating that the PIoT device has been registered in the network through the UE. The registration acceptance message of the PIoT device includes a UE ID and a PIoT device ID. Optionally, a PIoT registration success indication is further carried, indicating that the PIoT device is successfully registered.

It should be noted that steps 01 to 04 may alternatively occur any time after registration of the UE. Correspondingly, other NAS messages may be used as a replacement in steps 01 and 04.

It should be noted that, optionally, the UE may alternatively establish a session channel for the PIoT device according to the transmission manner of the data of the Passive IoT device in the access policy of the PIoT.

An embodiment of this application provides a registration method for an Internet of Things device. FIG. 6 is an interaction flowchart of a registration method for an Internet of Things device according to an embodiment of this application. As shown in FIG. 6, the registration method for an Internet of Things device provided in this embodiment of this application may include the following step 1 to step 5.

Step 1. A RAN obtains an identifier of the Passive IoT device.

For a detailed implementation of the RAN obtaining the identifier of the Passive IoT device, refer to description of Embodiment 2.

Step 2. The RAN sends a registration request message of the PIoT device to an AMF, to indicate registration for the PIoT device.

For example, the registration request message of the PIoT device includes a RAN ID and a PIoT device ID. A PIoT registration indication may further be carried, to indicate registration for the PIoT device.

The registration request message of the PIoT device may be an NGAP protocol message, a NAS protocol message, or other protocol messages. For example, the registration request message of the PIoT device may be an initial PIoT message, including a PIoT device registration parameter. The PIoT device registration parameter includes the UE ID and the PIoT device ID. Optionally, the registration request message of the PIoT device may include an access type, whose value is indicated as the PIoT registration.

It should be noted that the PIoT device ID may be the same as or different from the identifier of the Passive IoT device obtained by the RAN in step 1. In a possible implementation, the RAN may assemble the identifier of the Passive IoT device obtained in step 5 according to a form defined by the 3GPP, for example, assemble the identifier of the Passive IoT device according to an SUPI or SUCI format. For assembly examples, refer to the description of step 6 in Embodiment 2. In another possible implementation, the RAN may be identifier information allocated by the PIoT device on an NGAP interface and used for representing the PIoT device, for example, referred to as a RAN NGAP PIoT ID. Optionally, the RAN stores an association relationship between the identifier of the Passive IoT device obtained in step 1 and the identifier information on the NGAP interface used for representing the PIoT device.

Step 3. The AMF sends the registration request message of the PIoT device to a UDM.

Step 4. The UDM sends subscription information of the PIoT device to the AMF.

Steps 3 and 4 may refer to description in steps 7 and 8 in Embodiment 2.

Step 5. The AMF sends a registration response message of the PIoT device to the RAN, indicating that the PIoT device has been registered in a network through a UE. A registration acceptance message of the PIoT device includes a UE ID and a PIoT device ID. Optionally, a PIoT registration success indication is further carried, indicating that the PIoT device is successfully registered.

The registration response message of the PIoT device and the registration request message of the PIoT device may be messages of the same protocol, for example, an NGAP protocol message, a NAS protocol message, or other protocol messages.

Optionally, the AMF may be identifier information allocated by the PIoT device on the NGAP interface and used for representing the PIoT device, for example, referred to as a AMF NGAP PIoT ID. Optionally, the AMF stores the association relationship between the identifier of the Passive IoT device obtained in step 1 and the identifier information on the NGAP interface used for representing the PIoT device.

It should be noted that before steps of this embodiment, the RAN may obtain an access policy of the PIoT. For details on how the RAN obtains the access policy of the PIoT, refer to the description in steps 1 to 4 in Embodiment 2.

FIG. 7 shows four implementations of a UE obtaining an identifier of a Passive IoT device according to an embodiment of this application.

Option A:

The UE sends an excitation signal to the PIoT device. The UE receives reflection from the PIoT device. The identifier of the PIoT device may be included in the reflection, or may not be included in the reflection but in another message sent by the PIoT device.

Optionally, the RAN sends an excitation signal trigger condition to the UE, to trigger the UE to send the excitation signal to the PIoT device. The excitation signal trigger condition may include: an excitation signal trigger or indication information, indicating the UE to send the excitation signal. The excitation signal trigger indication information may be a piece of indication information, or may be an excitation signal sent by the RAN. For example, the excitation signal trigger condition may be included in RRC signaling, or may be transmitted by using other protocols, which is not limited in this embodiment of this application.

Optionally, the UE sends the identifier of the PIoT device to the RAN. For example, the UE may send an RRC message or a reflection signal to the RAN, including the identifier of the PIoT device. Alternatively, the UE may send a PIoT message to the RAN, including the identifier of the PIoT device.

The UE and/or the RAN may perform Option A according to the access policy of the PIoT. For example, a manner of steps A1+A2 may be understood as that the UE is used as a reader/writer of the Passive IoT device.

When step A0 is an excitation signal, it may be understood as that the UE is used as a relay of the excitation signal.

When step A3 is a reflection signal, it may be understood as that the UE is used as a relay of the reflection signal. When step A3 is not a reflection signal, it may be understood as that the UE sends the identifier information of the PIoT device to the RAN.

Option B:

The UE sends an excitation signal to the PIoT device. The RAN receives the identifier information of the PIoT device from the PIoT device. The identifier of the PIoT device may be included in reflection of the excitation signal, or may not be included in the reflection but in another message sent by the PIoT device.

Optionally, the RAN sends an excitation signal trigger condition to the UE, to trigger the UE to send the excitation signal to the PIoT device. The excitation signal trigger condition may refer to the description of Option A.

Optionally, the RAN sends the identifier of the PIoT device to the UE. For example, the RAN may send an RRC message to the UE, including the identifier of the PIoT device. Alternatively, the RAN may send a PIoT message to the UE, including the identifier of the PIoT device.

The UE and/or the RAN may perform Option B according to the access policy of the PIoT. For example, a manner of steps B1+B2 may be understood as that the UE transmits an excitation signal, and the RAN receives a reflection signal.

When step B0 is an excitation signal, it may be understood as that the UE is used as a relay of the excitation signal.

Step B3 may be understood as that the RAN sends the identifier information of the PIoT device to the UE.

Option C:

The RAN sends an excitation signal to the PIoT device. The UE receives the identifier information of the PIoT device from the PIoT device. The identifier of the PIoT device may be included in reflection of the excitation signal, or may not be included in the reflection but in another message sent by the PIoT device.

Optionally, the UE sends the identifier of the PIoT device to the RAN. For example, the UE may send an RRC message to the RAN, including the identifier of the PIoT device. Alternatively, the UE may send a PIoT message to the RAN, including the identifier of the PIoT device.

The UE and/or the RAN may perform Option C according to the access policy of the PIoT. For example, a manner of steps C1+C2 may be understood as that the RAN transmits an excitation signal, and the UE receives a reflection signal.

Step C3 may refer to description in step A3.

Option D:

The RAN sends an excitation signal to the PIoT device. The RAN receives the identifier information of the PIoT device from the PIoT device. The identifier of the PIoT device may be included in reflection of the excitation signal, or may not be included in the reflection but in another message sent by the PIoT device. The RAN sends the identifier information of the PIoT device to the UE.

Optionally, the RAN sends the identifier of the PIoT device to the UE. For example, the RAN may send an RRC message to the UE, including the identifier of the PIoT device. Alternatively, the RAN may send a PIoT message to the UE, including the identifier of the PIoT device.

The UE and/or the RAN may perform Option D according to the access policy of the PIoT. For example, a manner of steps D1+D2 may be understood as that the RAN is used as a reader/writer (the RAN transmits an excitation signal, and receives a reflection signal).

Step D3 may refer to description in step B3.

For example, the identifier information of the Passive IoT device may be electronic product code (EPC), a MAC address, or other information that identifies the Passive IoT device. The identifier information of the Passive IoT device may alternatively exist in at least one of the following forms: an SUPI, an SUCI, or a GPSI.

It may be determined according to the access policy of the PIoT or configuration that how the UE obtains the identifier of the Passive IoT device.

For example, the access policy of the PIoT indicates that the UE is used as the reader/writer of the Passive IoT device, and the identifier information of the PIoT is obtained in a manner of Option A by using the UE.

The UE is used as a reader/writer of the Passive IoT device (the UE sends an excitation signal, and receives a reflection signal from the Passive IoT device), the UE receives a reflection signal of the Passive IoT device, the UE sends an excitation signal, the UE transmits uplink data of the Passive IoT device, the UE transmits downlink data of the Passive IoT device, the UE transmits data of the Passive IoT device, the UE is used as a relay of the excitation signal, and the UE is used as a relay of the reflection signal.

In the embodiments of this application, the passive Internet of Things device is an example of an Internet of Things device. A Passive IoT device is also referred to as a PIOT device or a PIoT device sometimes.

It should be noted that the registration method for an Internet of Things device provided in the embodiments of this application may also be performed by a registration apparatus for an Internet of Things device, or a control module configured to perform the registration method for an Internet of Things device in the registration apparatus for an Internet of Things device.

Figure 8:
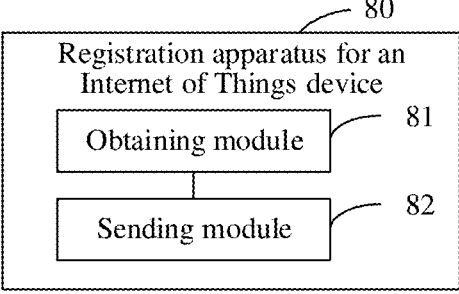
FIG. 8 is a schematic structural diagram 1 of a registration apparatus for an Internet of Things device according to an embodiment of this application.

FIG. 8 is a possible schematic structural diagram of a registration apparatus for an Internet of Things device according to an embodiment of this application. As shown in FIG. 8, a registration apparatus 80 for an Internet of Things device may include: an obtaining module 81 and a sending module 82.

The obtaining module 81 is configured to obtain first policy information, where the first policy information is used for describing that an Internet of Things device is allowed to access a target device; and obtain an identifier of the Internet of Things device according to the first policy information. The sending module 82 is configured to send a registration request message to a core network device. The registration request message is used for requesting to register the Internet of Things device into a core network device. The registration request message includes the identifier of the Internet of Things device.

In a possible implementation, the first policy information is further used for describing an access manner for the Internet of Things device to access the target device.

In a possible implementation, the access manner includes at least one of the following: the target device being used as a reader/writer of the Internet of Things device, the target device being used as a device that receives a reflection signal of the Internet of Things device, the target device being used as a device that sends an excitation signal to the Internet of Things device, the target device being used as a relay device that receives a reflection signal of the Internet of Things device, or the target device being used as a relay device that sends an excitation signal to the Internet of Things device.

In a possible implementation, the first policy information is further used for describing at least one of the following: an Internet of Things device that allows the target device to access, a signal transmission manner, or a data transmission manner of the Internet of Things device.

In a possible implementation, the obtaining module is configured to receive the first policy information from the core network device, where the first policy information is determined according to target information, and the target information includes at least one of the following: subscription information of the target device or configuration information of an operator corresponding to the target; or determine the first policy information according to policy-related configuration information locally stored.

In a possible implementation, the obtaining module 81 is configured to receive the first policy information from an access network device, where the target device is a user equipment UE, and the first policy information is determined by the access network device according to an access manner of an Internet of Things device supported by the UE and an access manner of an Internet of Things device supported by the access network device; or receive the first policy information from a UE, where the target device is an access network device, and the first policy information is determined by the UE according to an access manner of an Internet of Things device supported by the UE and an access manner of an Internet of Things device supported by the access network device.

In a possible implementation, the obtaining module 81 is configured to send an excitation signal to the Internet of Things device, where the excitation signal is used for triggering the Internet of Things device to send the identifier of the Internet of Things device; and receive the identifier of the Internet of Things device from the Internet of Things device.

In a possible implementation, the obtaining module 81 is configured to receive, from an access network device, the identifier of the Internet of Things device from the Internet of Things device, where the target device is a UE; or receive, from a UE, the identifier of the Internet of Things device from the Internet of Things device, where the target device is an access network device.

In a possible implementation, the obtaining module 81 is configured to receive a reflection signal that corresponds to the excitation signal and that is from the Internet of Things device, where the reflection signal includes the identifier of the Internet of Things device.

In a possible implementation, the registration request message further includes an identifier of the target device.

In a possible implementation, the registration request message further includes the first indication information. The first indication information is used for indicating to register the Internet of Things device into the core network device.

In a possible implementation, the target device is an access network device, and the registration request message further includes a first identifier. The first identifier is an identifier allocated by the access network device for the Internet of Things device, and used for indicating the Internet of Things device on an interface between the access network device and the core network device.

In a possible implementation, the identifier of the Internet of Things device included in the registration request message is: an identifier converted into SUCI format or an identifier converted into SUPI format.

In a possible implementation, the sending module is further configured to send capability information to the core network device before the obtaining module obtains the first policy information, where the capability information is used for describing that the target device supports the Internet of Things device accessing a communication network through the target device.

This embodiment of this application provides a registration apparatus for an Internet of Things device. The registration apparatus for an Internet of Things device may obtain the identifier of the Internet of Things device according to the first policy information after obtaining the first policy information. The first policy information is used for describing that the Internet of Things device is allowed to access the target device. Therefore, the registration apparatus for an Internet of Things device may send the registration request message to the core network device. The registration request message is used for requesting to register the Internet of Things device into the core network device. The registration request message includes the identifier of the Internet of Things device. In this way, registration of the Internet of Things device in a 5G core network may be completed with assistance of the target device, which reduces communication costs between the Internet of Things device and the core network device, and enables the core network device to control and manage the Internet of Things device.

The registration apparatus for an Internet of Things device provided in this embodiment of this application can implement various processes implemented by the target device in the foregoing method embodiments and achieve the same technical effect. To avoid repetition, details are not described herein again.

The registration apparatus for an Internet of Things device in this embodiment of this application may be a UE or an access network device, for example, a UE with an operating system, or may be a component in the UE, for example, an integrated circuit or a chip. The UE may be a terminal, or may be other devices other than the terminal. For example, the UE may include, but is not limited to, the types of the terminal 11 listed above, and other devices may be a server, network attached storage (NAS), or the like, which is not specifically limited in this embodiment of this application.

FIG. 9 is a possible schematic structural diagram of a registration apparatus for an Internet of Things device according to an embodiment of this application. As shown in FIG. 9, a registration apparatus 90 for an Internet of Things device may include: a sending module 91 and a receiving module 92.

The sending module 91 is configured to send first policy information to a target device, where the first policy information is used for describing that an Internet of Things device is allowed to access the target device; and the receiving module 92 is configured to receive a registration request message from the target device, where the registration request message is used for requesting to register the Internet of Things device into a core network device, and the registration request message includes an identifier of the Internet of Things device.

In a possible implementation, the registration apparatus 90 of an Internet of Things device provided in this embodiment of this application further includes: a determining module. The determining module is configured to determine the first policy information according to target information before the sending module sends the first policy information to the target device, where the target information includes at least one of the following: subscription information of the target device or configuration information of an operator corresponding to the target device.

In a possible implementation, the receiving module 92 is further configured to receive capability information from the target device before the sending module sends the first policy information to the target device, where the capability information is used for describing that the target device supports the Internet of Things device accessing a communication network through the target device.

This embodiment of this application provides a registration apparatus for an Internet of Things device. The registration apparatus for an Internet of Things device may obtain the identifier of the Internet of Things device according to the first policy information after obtaining the first policy information. The first policy information is used for describing that the Internet of Things device is allowed to access the target device. Therefore, the registration apparatus for an Internet of Things device may send the registration request message to the core network device. The registration request message is used for requesting to register the Internet of Things device into the core network device. The registration request message includes the identifier of the Internet of Things device. In this way, registration of the Internet of Things device in a 5G core network may be completed with assistance of the target device, which reduces communication costs between the Internet of Things device and the core network device, and enables the core network device to control and manage the Internet of Things device.

The registration apparatus for an Internet of Things device provided in this embodiment of this application can implement various processes implemented by the core network device in the foregoing method embodiments and achieve the same technical effect. To avoid repetition, details are not described herein again.

Optionally, as shown in FIG. 10, an embodiment of this application further provides a communication device 700, including a processor 701 and a memory 702. The memory 702 stores a program or instructions executable on the processor 701. For example, when the communication device 700 is a UE or an access network device, the program or the instructions, when executed by the processor 701, implement each step of the foregoing method embodiments on a target device side, and can achieve the same technical effect. When the communication device 700 is a core network device, the program or the instructions, when executed by the processor 701, implement each step of the foregoing method embodiments on a core network device side, and can achieve the same technical effect. To avoid repetition, details are not described herein again.

Figure 11:
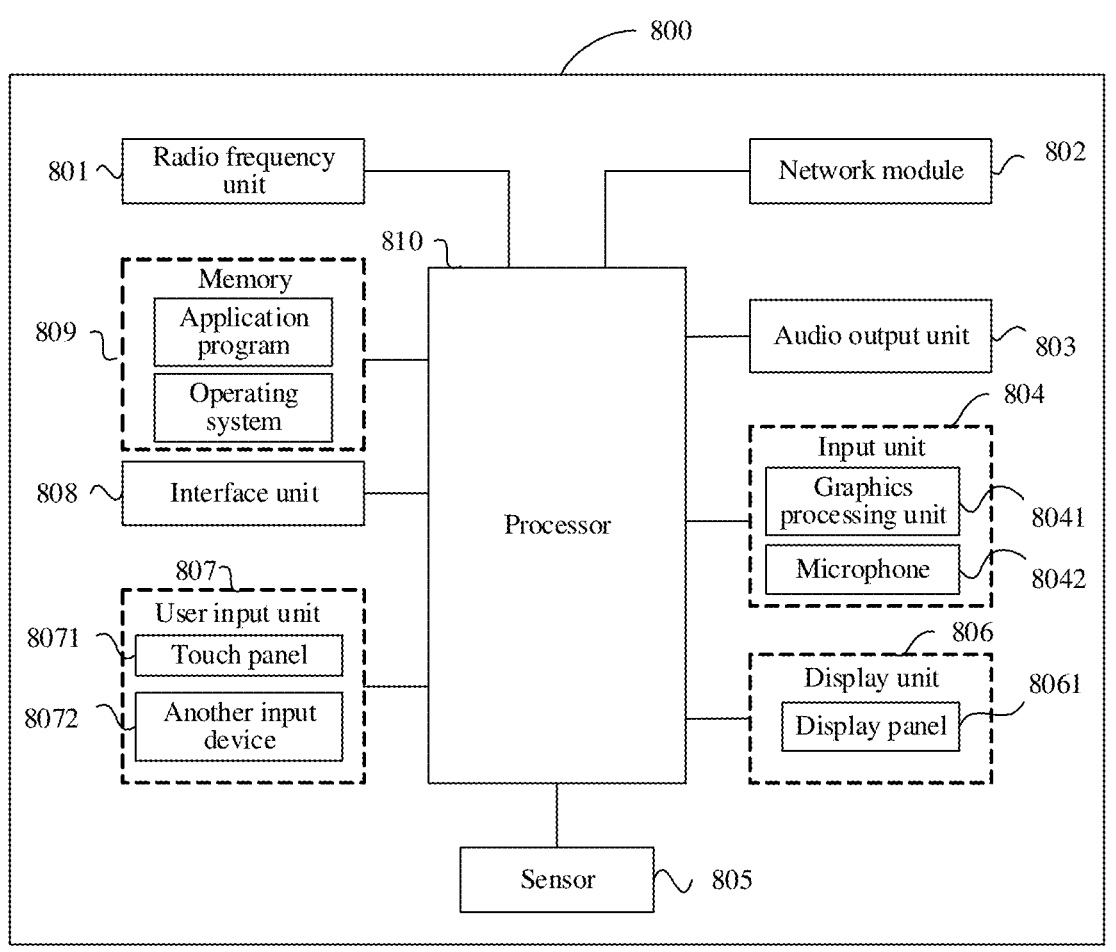
FIG. 11 is a schematic diagram of a hardware structure of a UE according to an embodiment of this application.

An embodiment of this application further provides a UE, including a processor and a communication interface. The processor is configured to obtain first policy information, where the first policy information is used for describing that an Internet of Things device is allowed to access a target device, and obtain an identifier of the Internet of Things device according to the first policy information. The communication interface is configured to send a registration request message to a core network device. The registration request message is used for requesting to register the Internet of Things device into the core network device. The registration request message includes the identifier of the Internet of Things device. The UE embodiment corresponds to the foregoing method embodiments on the target device side, and all implementation processes and implementations of the foregoing method embodiments are applicable to the UE embodiment, and can achieve the same technical effect. Exemplarily, FIG. 11 is a schematic diagram of a hardware structure of a UE that implements the embodiments of this application.

The UE 800 includes, but is not limited to: at least a part of components such as a radio frequency unit 801, a network module 802, an audio output unit 803, an input unit 804, a sensor 805, a display unit 806, a user input unit 807, an interface unit 808, a memory 809, and a processor 810.

A person skilled in the art may understand that the UE 800 may further include a power supply (such as a battery) for supplying power to the components. The power supply may be logically connected to the processor 810 by using a power management system, thereby implementing functions such as charging, discharging, and power consumption management by using the power management system. A structure of the UE shown in FIG. 11 constitutes no limitation on the UE, and the UE may include more or fewer components than those shown in the figure, or some components may be combined, or a different component deployment may be used, which is not described herein again.

It should be understood that in this embodiment of this application, the input unit 804 may include a graphics processing unit (GPU) 8041 and a microphone 8042. The graphics processing unit 8041 performs processing on image data of a static picture or a video obtained by an image acquisition device (for example, a camera) in a video acquisition mode or an image acquisition mode. The display unit 806 may include a display panel 8061, and the display panel 8061 may be configured by using a liquid crystal display, an organic light-emitting diode, or the like. The user input unit 807 includes at least one of a touch panel 8071 or another input device 8072. The touch panel 8071 is also referred to as a touch screen. The touch panel 8071 may include two parts: a touch detection apparatus and a touch controller. The another input device 8072 may include, but is not limited to, a physical keyboard, a functional key (such as a volume control key or a switch key), a track ball, a mouse, and a joystick, which are not described herein again.

In this embodiment of this application, after receiving downlink data from a network side device, the radio frequency unit 801 may transmit the downlink data to the processor 810 for processing. In addition, the radio frequency unit 801 may send uplink data to the network side device. Generally, the radio frequency unit 801 includes, but is not limited to, an antenna, an amplifier, a transceiver, a coupler, a low noise amplifier, a duplexer, and the like.

The memory 809 may be configured to store a software program or instructions and various data. The memory 809 may mainly include a first storage area for storing a program or instructions and a second storage area for storing data. The first storage area may store an operating system, an application program or instructions required by at least one function (for example, a sound playback function and an image display function), and the like. In addition, the memory 809 may include a volatile memory or a nonvolatile memory, or the memory 809 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). The memory 809 in this embodiment of this application includes, but is not limited to, these memories and any other suitable types.

The processor 810 may include one or more processing units. Optionally, the processor 810 integrates an application processor and a modem. The application processor mainly processes operations related to an operating system, a user interface, an application program, and the like. The modem mainly processes wireless communication signals, such as a baseband processor. It may be understood that the modem may alternatively not be integrated into the processor 810.

The processor 810 is configured to obtain first policy information, where the first policy information is used for describing that an Internet of Things device is allowed to access a target device; and obtain an identifier of the Internet of Things device according to the first policy information.

The radio frequency unit 801 is configured to send a registration request message to a core network device. The registration request message is used for requesting to register the Internet of Things device into a core network device. The registration request message includes the identifier of the Internet of Things device.

This embodiment of this application provides a UE. The UE may obtain the identifier of the Internet of Things device according to the first policy information after obtaining the first policy information. The first policy information is used for describing that the Internet of Things device is allowed to access the UE. Therefore, the UE may send the registration request message to the core network device. The registration request message is used for requesting to register the Internet of Things device into the core network device. The registration request message includes the identifier of the Internet of Things device. In this way, registration of the Internet of Things device in a 5G core network may be completed with assistance of the UE, which reduces communication costs between the Internet of Things device and the core network device, and enables the core network device to control and manage the Internet of Things device.

An embodiment of this application further provides an access network device, including a processor and a communication interface. The processor is configured to obtain first policy information, where the first policy information is used for describing that an Internet of Things device is allowed to access a target device, and obtain an identifier of the Internet of Things device according to the first policy information. The communication interface is configured to send a registration request message to a core network device. The registration request message is used for requesting to register the Internet of Things device into the core network device. The registration request message includes the identifier of the Internet of Things device. The access network device embodiment corresponds to the foregoing method embodiments of the target device, and all implementation processes and implementations of the foregoing method embodiments are applicable to the access network device embodiment, and can achieve the same technical effect.

Figure 12:
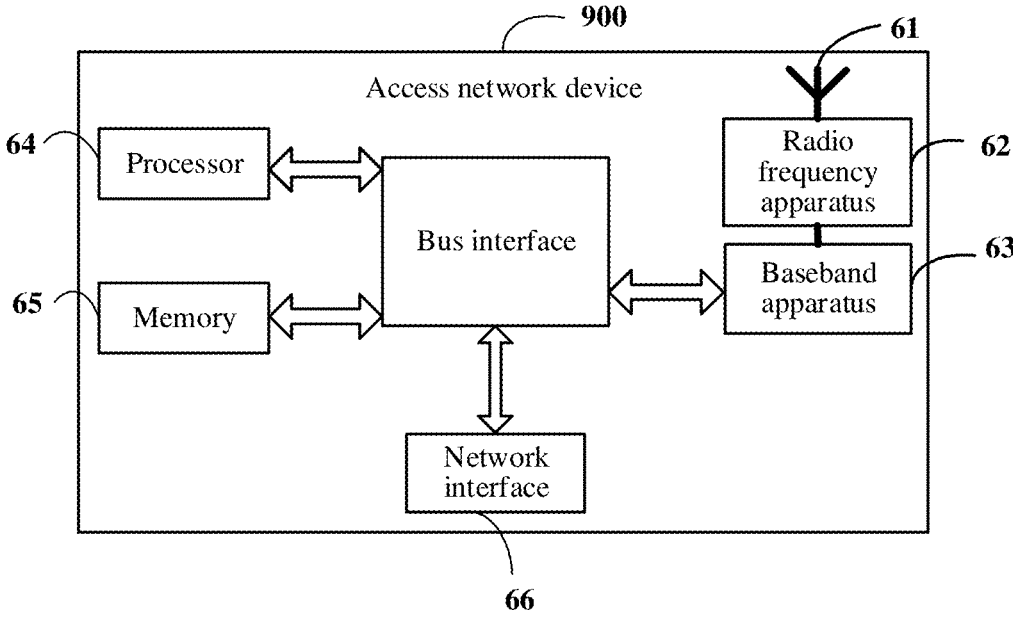
FIG. 12 is a schematic diagram of a hardware structure of an access network device according to an embodiment of this application.

Optionally, an embodiment of this application further provides an access network device. As shown in FIG. 12, the access network device 900 includes: an antenna 61, a radio frequency apparatus 62, a baseband apparatus 63, a processor 64, and a memory 65. The antenna 61 is connected to the radio frequency apparatus 62. In an uplink direction, the radio frequency apparatus 62 receives information through the antenna 61, and sends received information to the baseband apparatus 63 for processing. In a downlink direction, the baseband apparatus 63 processes information to be sent, and sends the information to the radio frequency apparatus 62, and the radio frequency apparatus 62 processes received information and then sends out the information through the antenna 61.

The method performed by the target device in the foregoing embodiments may be implemented in the baseband apparatus 63. The baseband apparatus 63 includes a baseband processor.

The baseband apparatus 63 is configured to obtain first policy information, where the first policy information is used for describing that an Internet of Things device is allowed to access a target device; and obtain an identifier of the Internet of Things device according to the first policy information.

The radio frequency apparatus 62 is configured to send a registration request message to a core network device. The registration request message is used for requesting to register the Internet of Things device into a core network device. The registration request message includes the identifier of the Internet of Things device.

This embodiment of this application provides an access network device. The access network device may obtain the identifier of the Internet of Things device according to the first policy information after obtaining the first policy information. The first policy information is used for describing that an Internet of Things device is allowed to access a target device. Therefore, the access network device may send the registration request message to the core network device. The registration request message is used for requesting to register the Internet of Things device into the core network device. The registration request message includes the identifier of the Internet of Things device. In this way, registration of the Internet of Things device in the 5G core network may be completed with assistance of the access network device, which reduces communication costs between the Internet of Things device and the core network device, and enables the core network device to control and manage the Internet of Things device.

The baseband apparatus 63, for example, may include at least one baseband processing board. A plurality of chips are arranged on the baseband processing board. As shown in FIG. 12, one of the chips is, for example, a baseband processor, and is connected to the memory 65, to invoke a program in the memory 65, to perform operations of a network device shown in the foregoing method embodiments.

The access network device may further include a network interface 66, and the interface is, for example, a common public radio interface (CPRI).

Optionally, the access network device 900 in this embodiment of this application further includes: instructions or a program stored in the memory 65 and executable on the processor 64. The processor 64 invokes the instructions or the program in the memory 65 to perform a method performed by modules, and achieves the same technical effect. To avoid repetition, details are not described herein again.

Figure 13:
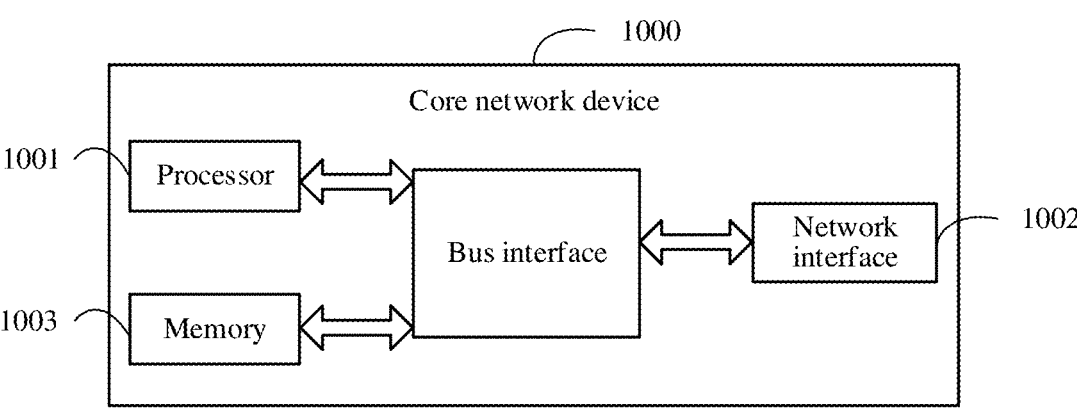
FIG. 13 is a schematic diagram of a hardware structure of a core network device according to an embodiment of this application.

Optionally, an embodiment of this application further provides a core network device. As shown in FIG. 13, the core network device 1000 includes: a processor 1001, a network interface 1002, and a memory 1003. The network interface 1002 is, for example, a common public radio interface (CPRI).

Optionally, the core network device 1000 in this embodiment of this application further includes: instructions or a program stored in the memory 1003 and executable on the processor 1001. The processor 1001 invokes the instructions or the program in the memory 1003 to perform a method performed by modules, and achieves the same technical effect. To avoid repetition, details are not described herein again.

An embodiment of this application further provides a readable storage medium. The readable storage medium stores a program or instructions. The program or the instructions, when executed by a processor, implement processes of the foregoing method embodiments, and can achieve the same technical effects. To avoid repetition, details are not described herein again.

The processor is the processor in the target device or the core network device described in the foregoing embodiments. The readable storage medium includes a computer-readable storage medium, such as a computer read-only memory ROM, a random access memory RAM, a magnetic disk, an optical disc, or the like.

An embodiment of this application further provides a chip. The chip includes a processor and a communication interface. The communication interface is coupled to the processor. The processor is configured to execute a program or instructions, to implement processes of the foregoing method embodiments, and can achieve the same technical effects. To avoid repetition, details are not described herein again.

It should be understood that the chip provided in this embodiment of this application may also be referred to as a system-level chip, a system chip, a chip system, a system on chip, or the like.

An embodiment of this application further provides a computer program/program product. The computer program/program product is stored in a storage medium. The computer program/program product is executed by at least one processor to implement processes of the foregoing method embodiments, and can achieve the same technical effect. To avoid repetition, details are not described herein again.

An embodiment of this application further provides a communication system, including: a communication device (that is, a UE or an access network device) and a core network device. The communication device may be configured to perform steps of the foregoing registration method for an Internet of Things device. The core network device may be configured to perform steps of the foregoing registration method for an Internet of Things device.

It should be noted that terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the method and apparatus in the implementations of this application is not limited to performing the functions in the order shown or discussed, but may further include performing the functions in a substantially simultaneous manner or in reverse order according to the functions involved, for example, the described method may be performed in a different order than described, and various steps may be added, omitted, or combined. In addition, features described with reference to some examples may be combined in other examples.

Through the descriptions of the foregoing implementations, a person skilled in the art may clearly understand that the method in the foregoing embodiments may be implemented by using software and a necessary general hardware platform, and certainly, may alternatively be implemented by using hardware, but in many cases, the former manner is a better implementation. Based on such an understanding, the technical solutions of this application essentially or the part contributing to the related art may be implemented in a form of a computer software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing implementations. The foregoing implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A registration method for an Internet of Things device, comprising:

obtaining, by a target device, first policy information, wherein the first policy information is used for describing that the Internet of Things device is allowed to access the target device;

obtaining, by the target device, an identifier of the Internet of Things device according to the first policy information; and sending, by the target device, a registration request message to a core network device, wherein the registration request message is used for requesting to register the Internet of Things device into the core network device, and the registration request message comprises the identifier of the Internet of Things device.

2. The registration method according to claim 1, wherein the first policy information is further used for describing an access manner for the Internet of Things device to access the target device.

3. The registration method according to claim 2, wherein the access manner comprises at least one of the following: the target device being used as a reader/writer of the Internet of Things device, the target device being used as a device that receives a reflection signal of the Internet of Things device, the target device being used as a device that sends an excitation signal to the Internet of Things device, the target device being used as a relay device that receives a reflection signal of the Internet of Things device, or the target device being used as a relay device that sends an excitation signal to the Internet of Things device.

4. The registration method according to claim 1, wherein the first policy information is further used for describing at least one of the following: one or more Internet of Things device that allows the target device to access, a signal transmission manner, or a data transmission manner of the Internet of Things device;

wherein the one or more Internet of Things device comprises the Internet of Things device.

5. The registration method according to claim 1, wherein the obtaining, by the target device, first policy information comprises:

receiving, by the target device, the first policy information from the core network device;

or determining, by the target device, the first policy information according to policy-related configuration information locally stored.

6. The registration method according to claim 1, wherein the obtaining, by the target device, first policy information comprises:

receiving, by the target device, the first policy information from an access network device, wherein the target device is a user equipment (UE), and the first policy information is determined by the access network device according to an access manner for Internet of Things devices supported by the UE and an access manner for Internet of Things devices supported by the access network device;

or receiving, by the target device, the first policy information from a UE, wherein the target device is an access network device, and the first policy information is determined by the UE according to an access manner for Internet of Things devices supported by the UE and an access manner for Internet of Things devices supported by the access network device.

7. The registration method according to claim 1, wherein the obtaining, by the target device, an identifier of the Internet of Things device according to the first policy information comprises:

sending, by the target device, an excitation signal to the Internet of Things device, wherein the excitation signal is used for triggering the Internet of Things device to send the identifier of the Internet of Things device; and receiving, by the target device, the identifier of the Internet of Things device from the Internet of Things device.

8. The registration method according to claim 7, wherein the receiving, by the target device, the identifier of the Internet of Things device from the Internet of Things device comprises:

receiving, by the target device from an access network device, the identifier of the Internet of Things device from the Internet of Things device, wherein the target device is a UE;

or receiving, by the target device from a UE, the identifier of the Internet of Things device from the Internet of Things device, wherein the target device is an access network device.

9. The registration method according to claim 7, wherein the receiving, by the target device, the identifier of the Internet of Things device from the Internet of Things device comprises:

receiving, by the target device, a reflection signal that corresponds to the excitation signal and that is from the Internet of Things device, wherein the reflection signal comprises the identifier of the Internet of Things device.

10. The registration method according to claim 1, wherein the registration request message further comprises an identifier of the target device.

11. The registration method according to claim 1, wherein the registration request message further comprises first indication information, wherein the first indication information is used for indicating to register the Internet of Things device into the core network device.

12. The registration method according to claim 1, wherein the target device is an access network device, and the registration request message further comprises a first identifier, wherein the first identifier is an identifier allocated by the access network device for the Internet of Things device and used for indicating the Internet of Things device on an interface between the access network device and the core network device.

13. The registration method according to claim 1, wherein the identifier of the Internet of Things device comprised in the registration request message is: an identifier converted into subscription concealed identifier SUCI format, or an identifier converted into subscription permanent identifier SUPI format.

14. The registration method according to claim 1, wherein before the obtaining, by the target device, first policy information, the registration method further comprises:

sending, by the target device, capability information to the core network device, wherein the capability information is used for describing that the target device supports the Internet of Things device accessing a communication network through the target device.

15. A non-transitory readable storage medium, having a program or instructions stored therein, wherein the program or instructions, when executed by a first processor, implement steps of the registration method for the Internet of Things device according to claim 1.

16. A registration method for an Internet of Things device, comprising:

sending, by a core network device, first policy information to a target device, wherein the first policy information is used for describing that the Internet of Things device is allowed to access the target device; and receiving, by the core network device, a registration request message from the target device, wherein the registration request message is used for requesting to register the Internet of Things device into the core network device, and the registration request message comprises an identifier of the Internet of Things device.

17. The registration method according to claim 16, wherein before the sending, by the core network device, first policy information to the target device, the registration method further comprises:

determining, by the core network device, the first policy information according to target information, wherein the target information comprises at least one of the following: subscription information of the target device or configuration information of an operator corresponding to the target device.

18. The core network device, comprising a second processor and a second memory, wherein the second memory stores a program or instructions executable on the second processor, and the program or instructions, when executed by the second processor, implement steps of the registration method for the Internet of Things device according to claim 16.

19. A non-transitory readable storage medium, having a program or instructions stored therein, wherein the program or instructions, when executed by a second processor, implement steps of the registration method for the Internet of Things device according to claim 16.

20. A communication device, comprising a first processor and a first memory, wherein the first memory stores a program or instructions executable on the first processor, and the program or instructions, when executed by the first processor, cause the communication device to perform:

obtaining first policy information, wherein the first policy information is used for describing that an Internet of Things device is allowed to access the communication device;

obtaining an identifier of the Internet of Things device according to the first policy information; and sending a registration request message to a core network device, wherein the registration request message is used for requesting to register the Internet of Things device into the core network device, and the registration request message comprises the identifier of the Internet of Things device.

\* \* \* \* \*